(12) United States Patent
Yadavalli

(10) Patent No.: US 11,204,768 B2
(45) Date of Patent: Dec. 21, 2021

(54) INSTRUCTION LENGTH BASED PARALLEL INSTRUCTION DEMARCATOR

(71) Applicant: ONNIVATION LLC, San Jose, CA (US)

(72) Inventor: Sitaram Yadavalli, San Jose, CA (US)

( * ) Notice: Subject to any disclaimer, the term of this patent is extended or adjusted under 35 U.S.C. 154(b) by 0 days.

(21) Appl. No.: 16/991,408

(22) Filed: Aug. 12, 2020

(65) Prior Publication Data
US 2020/0387375 A1 Dec. 10, 2020

Related U.S. Application Data

(60) Provisional application No. 62/931,435, filed on Nov. 6, 2019.

(51) Int. Cl.
*G06F 9/30* (2018.01)

(52) U.S. Cl.
CPC ...... *G06F 9/30196* (2013.01); *G06F 9/30152* (2013.01)

(58) Field of Classification Search
CPC .................. G06F 9/30149; G06F 9/30152
See application file for complete search history.

(56) References Cited

U.S. PATENT DOCUMENTS

| 5,113,515 A | 5/1992 | Fite et al. |
| 5,148,528 A | 9/1992 | Fite et al. |
| 5,167,026 A | 11/1992 | Murray et al. |
| 5,202,967 A | 4/1993 | Matsuzaki et al. |
| 5,247,625 A | 9/1993 | Yoshitake et al. |
| 5,371,864 A | 12/1994 | Chuang |
| 5,450,605 A * | 9/1995 | Grochowski ....... G06F 9/30152 712/216 |
| 5,452,427 A | 9/1995 | Tobita et al. |
| 5,488,710 A | 1/1996 | Sato et al. |
| 5,535,347 A | 7/1996 | Grochowski et al. |
| 5,537,629 A | 7/1996 | Brown et al. |
| 5,581,774 A | 12/1996 | Yoshitake et al. |
| 5,586,277 A | 12/1996 | Brown et al. |
| 5,598,544 A | 1/1997 | Ohshima |
| 5,600,806 A * | 2/1997 | Brown ................ G06F 9/30152 712/204 |
| 5,740,392 A | 4/1998 | Brennan |
| 5,758,116 A | 5/1998 | Lee et al. |
| 5,774,737 A | 6/1998 | Nakano |
| 5,809,272 A | 9/1998 | Thusoo et al. |

(Continued)

FOREIGN PATENT DOCUMENTS

| EP | 0079995 A1 | 6/1983 |
| EP | 0545927 B1 | 11/1991 |

(Continued)

*Primary Examiner* — Keith E Vicary
(74) *Attorney, Agent, or Firm* — Lincoln Law School of San Jose

(57) ABSTRACT

Instruction length based parallel instruction demarcators and methods for parallel instruction demarcation are included, wherein an instruction sequence is received at an instruction buffer, the instruction sequence comprising a plurality of instruction syllables, and the instruction sequence is stored at the instruction buffer. It is determined, using one or more logic blocks arranged in a sequence, a length of instructions and at least one boundary. Additionally, using a controlling logic block, the sequence is demarcated into individual instructions.

19 Claims, 15 Drawing Sheets

(56) References Cited

U.S. PATENT DOCUMENTS

| | | | |
|---|---|---|---|
| 5,809,273 A | 9/1998 | Favor et al. | |
| 5,819,057 A | 10/1998 | Witt et al. | |
| 5,819,059 A | 10/1998 | Tran | |
| 5,822,558 A | 10/1998 | Tran | |
| 5,826,053 A | 10/1998 | Witt | |
| 5,832,259 A | 11/1998 | Stiles | |
| 5,845,100 A | 12/1998 | Gupta et al. | |
| 5,852,727 A * | 12/1998 | Narayan | G06F 9/30018 712/215 |
| 5,859,994 A | 1/1999 | Zaidi | |
| 5,881,260 A | 3/1999 | Raje et al. | |
| 5,898,851 A | 4/1999 | Narayan et al. | |
| 5,940,602 A | 8/1999 | Narayan et al. | |
| 5,941,980 A | 8/1999 | Shang et al. | |
| 5,941,982 A | 8/1999 | Ginosar et al. | |
| 5,948,096 A | 9/1999 | Ginosar et al. | |
| 5,970,235 A | 10/1999 | Witt et al. | |
| 5,978,899 A | 11/1999 | Ginosar et al. | |
| 5,987,235 A | 11/1999 | Tran | |
| 6,012,125 A | 1/2000 | Tran | |
| 6,032,250 A * | 2/2000 | Zaidi | G06F 9/30152 712/210 |
| 6,041,405 A | 3/2000 | Green | |
| 6,049,863 A * | 4/2000 | Tran | G06F 9/3853 712/213 |
| 6,105,125 A | 8/2000 | Nemirovsky et al. | |
| 6,115,807 A | 9/2000 | Grochowski | |
| 6,125,441 A | 9/2000 | Green | |
| 6,175,908 B1 | 1/2001 | Pickett | |
| 6,237,074 B1 | 5/2001 | Phillips et al. | |
| 6,308,257 B1 * | 10/2001 | Theogarajan | G06F 9/30145 711/209 |
| 6,405,303 B1 * | 6/2002 | Miller | G06F 9/30149 712/204 |
| 6,463,520 B1 | 10/2002 | Otani et al. | |
| 6,678,818 B1 | 1/2004 | Cofler et al. | |
| 6,684,322 B1 | 1/2004 | Gruner et al. | |
| 6,704,361 B2 | 3/2004 | Bublil et al. | |
| 7,213,129 B1 | 5/2007 | Gruner et al. | |
| 7,340,589 B2 | 3/2008 | Kudo | |
| 7,366,874 B2 | 4/2008 | Seong et al. | |
| 7,640,417 B2 | 12/2009 | Madduri | |
| 7,675,437 B2 | 3/2010 | Tsai et al. | |
| 7,676,659 B2 | 3/2010 | Stempel et al. | |
| 7,773,005 B2 | 8/2010 | Frank | |
| 7,818,542 B2 | 10/2010 | Shen et al. | |
| 7,818,543 B2 | 10/2010 | Shen et al. | |
| 7,962,725 B2 | 6/2011 | Smith et al. | |
| 8,347,067 B2 | 1/2013 | Greenhalgh et al. | |
| 8,774,281 B2 | 7/2014 | Luna et al. | |
| 8,930,678 B2 | 1/2015 | Madduri et al. | |
| 9,606,931 B2 | 3/2017 | Galan et al. | |
| 9,898,291 B2 | 2/2018 | Henry et al. | |
| 2002/0087848 A1 * | 7/2002 | Homewood | G06F 9/30058 712/234 |
| 2003/0225998 A1 | 12/2003 | Khan et al. | |
| 2004/0024992 A1 | 2/2004 | Ku | |
| 2004/0128479 A1 | 7/2004 | Madduri et al. | |
| 2009/0187742 A1 | 7/2009 | Greenhalgh et al. | |
| 2015/0347142 A1 | 12/2015 | Godard et al. | |
| 2019/0250915 A1 | 8/2019 | Yadavalli | |

FOREIGN PATENT DOCUMENTS

| | | |
|---|---|---|
| EP | 0416345 A3 | 3/1993 |
| EP | 0354740 B1 | 6/1996 |
| EP | 0825529 A2 | 2/1998 |
| EP | 0853779 A1 | 7/1998 |
| EP | 0896700 A1 | 2/1999 |
| EP | 0912923 A1 | 5/1999 |
| EP | 0945782 A1 | 9/1999 |
| EP | 0853782 B1 | 6/2001 |
| EP | 0905612 B1 | 8/2002 |
| EP | 1290548 A2 | 3/2003 |
| EP | 1021759 B1 | 7/2006 |
| EP | 1457876 A3 | 11/2006 |
| EP | 0942359 B1 | 7/2012 |
| EP | 0992892 B1 | 12/2015 |
| GB | 2263986 A | 8/1993 |
| IN | 2245MUMNP2008 A | 1/2009 |
| IN | 1667MUMNP2009 | 3/2010 |
| IN | 270647 B | 1/2016 |
| SG | 54033 A1 | 11/1998 |
| SG | 96007 A1 | 6/2003 |
| SG | 146951 A1 | 11/2008 |
| WO | 1997048041 A1 | 12/1997 |
| WO | 9320507 A2 | 9/1999 |
| WO | 0195101 A2 | 5/2001 |
| WO | 0244894 A2 | 11/2001 |
| WO | 2002019098 A1 | 3/2020 |

* cited by examiner

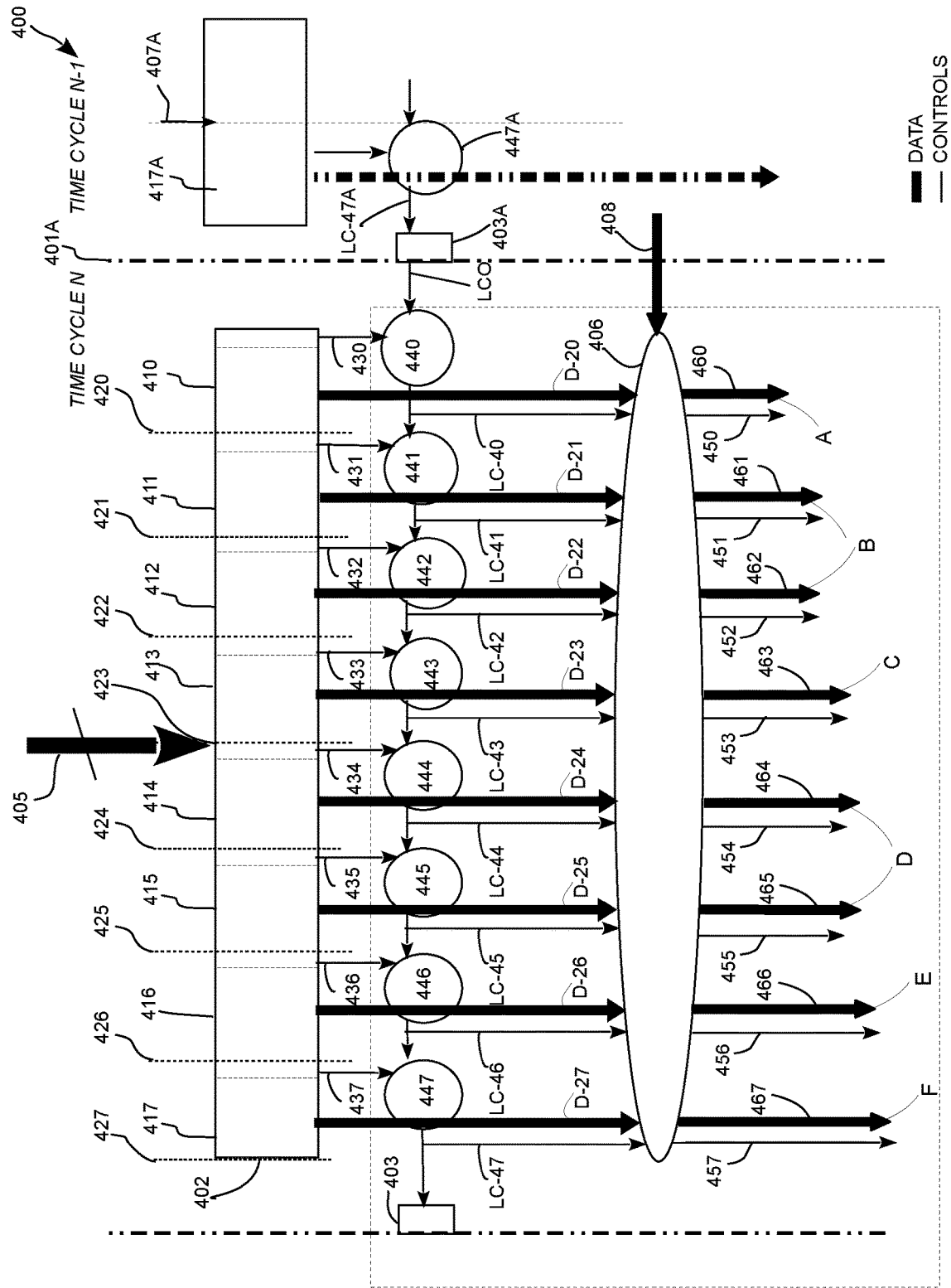

INSTRUCTION LENGTH BASED PARALLEL INSTRUCTION DEMARCATOR

RELATED APPLICATIONS

The present application claims priority to and the benefit of U.S. Provisional Application No. 62/931,435 filed 2019 Nov. 6, the entire contents of all of which are incorporated herein by reference.

BACKGROUND OF THE INVENTION AND DESCRIPTION OF PRIOR ART

Field of the Invention

The present description generally relates to how machine instructions are identified, demarcated and decoded in a computing or processing unit.

Background

Traditional RISC architecture based processing units simply use the one standard instruction width of an architecture to mark the boundary of any instruction and hence implement trivial instruction demarcation which cannot handle instructions of varied lengths. In contrast, traditional CISC architecture processing units use instructions of varied lengths and they shift/rotate instruction bytes to align instructions to decoders and feed them to determine the boundaries of instructions. They use elaborate decoders to determine instruction boundaries based on individual instructions and their complexity. This adds power and area costs to the decoding logic which increases energy consumption. There is thus a need for overcoming these and/or other issues when an architecture uses instructions of various lengths.

BRIEF SUMMARY

This application presents various implementations of instruction demarcators along with various methods for instruction demarcation. In use, an instruction sequence is received at an instruction buffer, the instruction sequence comprising a plurality of instruction syllables, and the instruction sequence is stored at the instruction buffer. It is determined, using one or more logic blocks arranged in a sequence, a length of instructions and at least one boundary. Additionally, using a controlling logic block, the sequence is demarcated into individual instructions.

BRIEF DESCRIPTION OF THE SEVERAL VIEWS OF THE DRAWINGS

FIG. 4A illustrates an implementation of an instruction demarcator, in accordance with one possible embodiment.

FIG. 9 illustrates a network architecture, in accordance with one possible embodiment.

FIG. 10 illustrates an exemplary system, in accordance with one possible embodiment.

DETAILED DESCRIPTION OF THE INVENTION

This description presents various implementations of instruction demarcators and various methods of instruction demarcation.

The following description of the embodiment(s) is merely exemplary (illustrative) in nature and is in no way intended to limit the invention, its application, or uses. Additionally, the invention may be practiced according to the claims without some or all of the illustrative information.

A machine architecture comprises an embodiment of a set of one or more machine instructions of an instruction set architecture implemented in a context of a processing unit; in the context of this description the terms instruction and machine instruction are used interchangeably; an embodiment of a computer program comprises one or more sequences of machine instructions which sequences hereinafter are referred to as instruction sequences.

Figure 1:
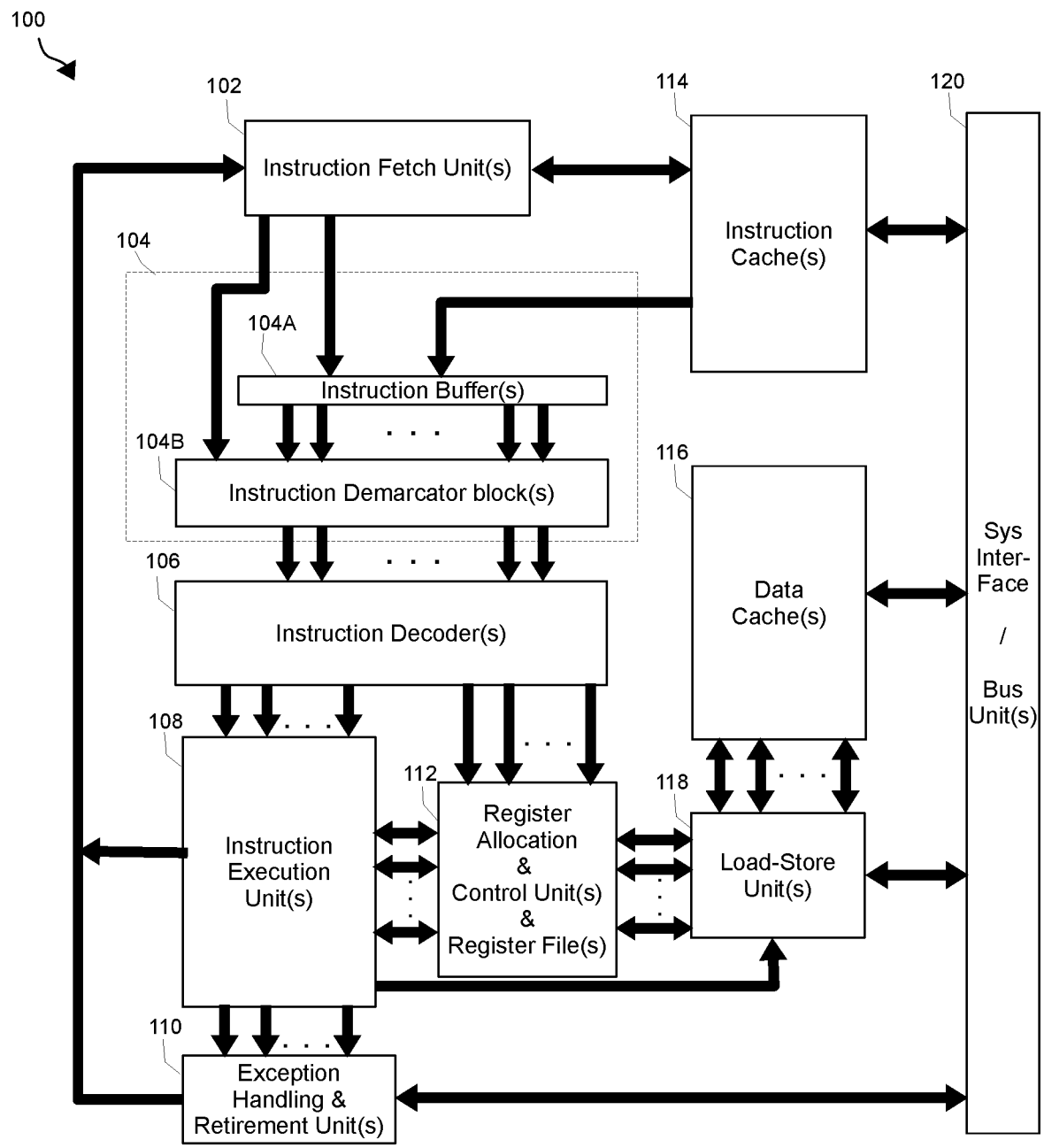
FIG. 1 illustrates a processing unit, in accordance with one possible embodiment.

FIG. 1 illustrates a processing unit 100 in accordance with one possible embodiment. Optionally, the processing unit 100 may be implemented in the context of any of the foregoing figures.

The processing unit 100 may be used for computation, control, graphics, communication and/or any form of data processing including machine learning in some embodiment. The processing unit 100 (referred to as a central processor in some embodiments) can be used in a system (such as FIG. 10) comprising a system memory, a storage, and other components in accordance with some embodiments for one or more applications.

In the embodiment shown in FIG. 1, the processing unit 100 comprises one or more instruction fetch unit(s) 102 coupled optionally to one or more optional instruction cache units 114. Instruction fetch unit 102 may optionally comprise or work in conjunction with a branch prediction logic in some preferred embodiments.

In the context of this description, in some embodiments the processing unit 100 also comprises one or more instruction demarcator(s) 104 which may be coupled to one or more instruction decoder(s) 106. In one embodiment an instruction demarcator 104 comprises an instruction buffer 104A or equivalent logic, and an instruction demarcation logic block 104B that works in conjunction with the instruction buffer 104A, as shown in FIG. 1. In some embodiments the instruction buffer 104A may be deemed to reside outside the boundary of the instruction demarcator 104 and/or may be included into another module/unit but it performs the same function as 104A. In some embodiments one or more functions or parts of the instruction demarcator 104 may themselves be separated into different sub-units or combined with other logic blocks such as an instruction queue or an instruction decoder. This does not change the functionality of the overall implementation of the instruction demarcator but merely impacts the organization (and perhaps the nomenclature) of the blocks.

Instruction fetch logic 102 may control and/or cause instruction sequences to be fetched from system memory (not shown in FIG. 1) and/or instruction cache unit(s) 114 or from some storage area (not shown) into the instruction buffer 104A. The instruction demarcation logic 104B may partially or completely demarcate instruction sequences into one or more individual instructions in various embodiments. These may be further demarcated (if needed) and decoded using instruction decoder 106, in some other embodiments.

Processing unit 100 may also comprise one or more instruction execution unit(s) (EXE) 108 which comprise logic units to perform various arithmetic, logic and other computations. EXE 108 may also perform branch target determination and branch related computations or may work in conjunction with a branch unit (not shown) that performs such and related functions. Processing unit 100 may also comprise one or more register allocation and control unit(s) (RAC) 112, further comprising one or more register files. Optionally, in some embodiments RAC 112 may comprise or work in conjunction with a re-order buffer (ROB) (not shown) and other control logic such as a scoreboard logic (not shown) for instruction and operand scheduling. Some embodiments may include one or more instruction schedulers (not shown) to schedule and control instruction execution in the processing unit.

Processing unit 100 further comprises one or more load and store unit(s) (LSU) 118 which may be coupled to EXE 108 and RAC 112. Processing unit 100 may further comprise a data cache unit (DCU) 116, and a system interface or bus unit (SYSI) 120. The processing unit 100 also comprises one or more unit(s) 110 for exception handling including interrupts, instruction retirement and branch control. A SYSI unit may further comprise logic to control and access one or more internal and external interfaces, modules and/or components such as one or more memory controllers (MMU) (not shown), one or more I/O controllers (IOC) (not shown), one or more interrupt controllers (included in unit(s) 110), one or more co-processors (not shown), one or more graphics interfaces (not shown) and display control units (not shown), one or more security processor units (not shown), one or more power controllers (not shown), one or more machine control and system configuration units (not shown), one or more test controllers (not shown), one or more internal and/or external transport interfaces (not shown), etc.

In many embodiments the instruction cache unit (ICU) 114 and data cache unit (DCU) 116 are coupled to the (SYSI) 120.

In some embodiments, one or more instances of the instruction demarcator 104 may be used inside some of the units associated with the system interface or other modules such as a co-processor, a machine controller, a security processor, a power controller, a test controller, a packet processor, etc.

FIG. 1 merely illustrates one possible embodiment where an instruction demarcator 104 may be used as configured. However, instruction demarcator 104 may be used in any other configuration where an instruction sequence may need to be demarcated into one or more instructions for further use, and some such example embodiments may include but not be limited to a graphics processor, a signal processor, a neuromorphic or machine learning processor, a matrix and array processor, an application specific field programmed processor on an FPGA, a string processor, a network processor, a packet processor, a stream processor, a baseband processor, a VLIW machine, a micro-controller, a micro-sequencer, a binary translator, a co-processor, etc. Further, these example embodiments may be embedded or stand-alone modules or components.

Further, the instruction demarcator 104 may be implemented in any technology, be it using any semiconductor technology such as silicon, silicon on insulator (SOI), etc., or in a system or device using newer technologies such as quantum computing or optical computing or spintronics; or it may even be implemented as a computer program product such as in a binary translation program product.

Each instruction in an instruction sequence comprises one or more binary instruction syllables (henceforth "syllables"); various instructions may have various lengths or sizes since they may have various numbers of syllables. Therefore, the number of syllables in an instruction determines its length or size. The two words, length and size, in this context, may mean identical attributes such as number of comprising syllables, or different but generally proportional attributes such as number of bits in the instruction or number of syllables in the instruction. In some embodiments all syllables may have identical number of bits. In some other embodiments, syllables may have different numbers of bits.

Instructions are generally known to comprise fields of one or more bits in the art. In the context of this description, each instruction comprises the following fields among others: a field named LEN, comprising one or more bits, which is used in demarcating an instruction from an adjacent instruction primarily based on the length of the instruction; further, a primary opcode field defining the functionality of an instruction at least in part. LEN may be utilized to classify instructions of various lengths into classes. In some embodiments it may be used to provide additional size information for an instruction. Optionally, an instruction may comprise additional fields like one or more op modifier (OPM) fields, one or more co-processor (CoP) fields, one or more operands and one or more opcode fields, some of which may be designated as secondary opcodes. Some of these fields may provide additional size information in some embodiments.

The bit position(s) of the LEN field in every instruction are the same relative to the start of the instruction. The LEN positioned bit(s) of a syllable refer to bit(s) that is/are at the same position relative to the start of the syllable as the corresponding bit(s) of the LEN field in a designated syllable of the instruction. For example, if the LEN field comprises the second bit of a single syllable instruction then the second bit of any syllable in an instruction of any size may be called a 'LEN positioned bit' of that syllable. In a multi-syllable instruction only one syllable (the designated syllable) has a LEN field but every syllable would have LEN positioned bits. LEN field is just one of the fields in an instruction or a syllable.

Figure 2:
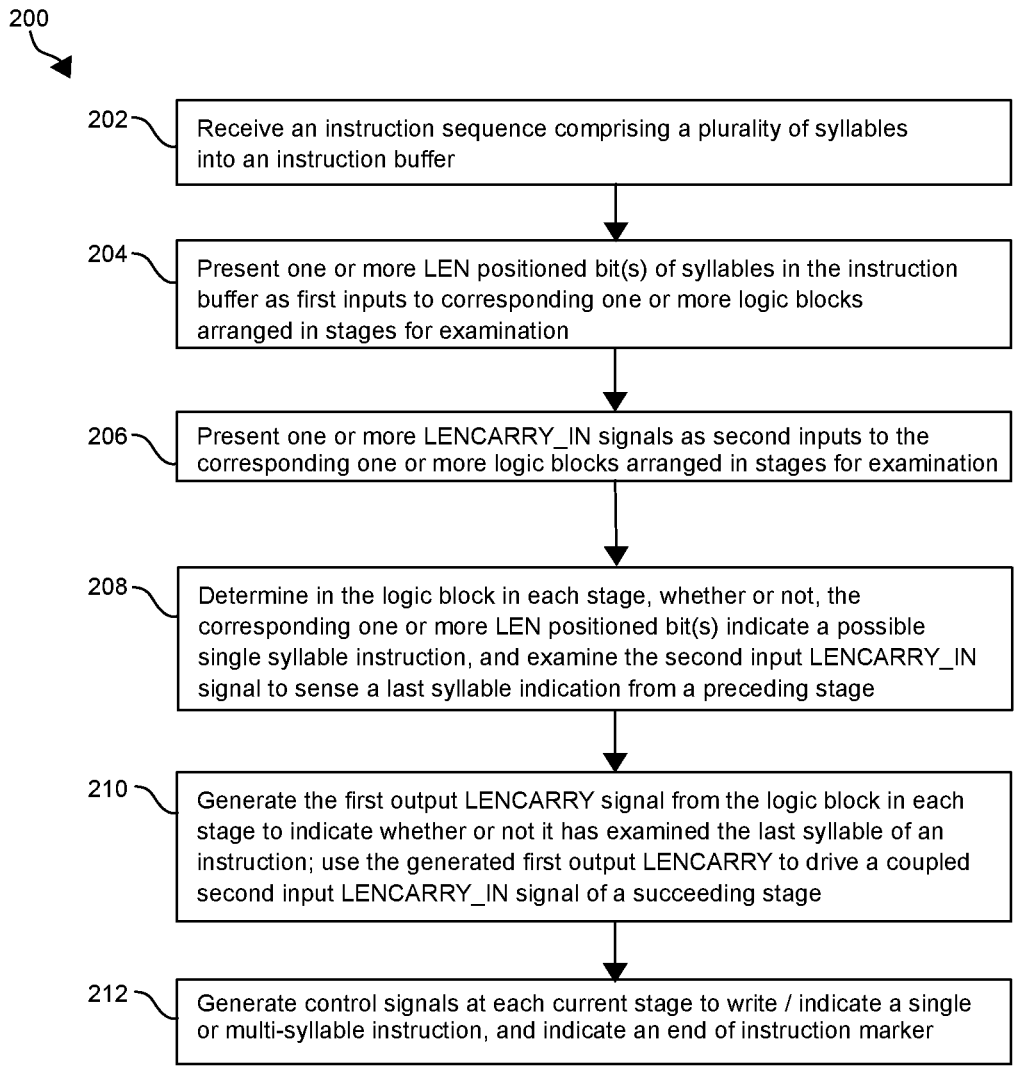
FIG. 2 illustrates a method for instruction demarcation, in accordance with one broad embodiment.

FIG. 2 illustrates a method 200 for instruction demarcation in accordance with one embodiment. Optionally, method 200 may be implemented in the context of any of the foregoing figures.

In the method 200, in operation 202, an instruction sequence comprising a plurality of syllables is received into an instruction buffer. Each syllable comprises one or more LEN positioned bit(s).

In operation 204, one or more LEN positioned bit(s) of syllables in the instruction buffer are presented as first inputs to corresponding one or more logic blocks arranged in stages for examination. In this context, the examination of the one or more LEN positioned bit(s) is done by a sequence of logic blocks that are arranged in stages corresponding with the syllables in the instruction buffer. In some embodiments the LEN positioned bit(s) of syllables may be presented concurrently, and in parallel to the one or more logic blocks arranged in stages as their first inputs.

In the context of a method, a logic block denotes a sub-procedure or a sub-process comprising the method. In the context of a device implementation, a logic block is a functional block that implements a certain functionality in a technology described in an embodiment; or in some embodiment such as electronic device or hardware it may comprise a circuit that implements an associated logic. In the context of a computer program product, a logic block comprises a procedure or a configured functional block implemented in the computer program product.

In operation 206, one or more LENCARRY_IN signals are presented as second inputs to the corresponding one or more logic blocks arranged in stages for examination. In this context, the second input LENCARRY_IN signal at one stage is coupled to a first output LENCARRY signal from the logic block in a preceding stage. In this context, the first output LENCARRY signal at any stage is the first output that is computed and generated by the logic block in that stage when determining instruction length; more specifically LENCARRY indicates whether or not the logic block possibly examined the last syllable of an instruction. Also, in this context, an 'input' refers to a signal value received, and possibly used, by a logic block, and an 'output' refers to a signal value generated and sent out by a logic block. Further, in various embodiments a signal may be sent via one or more physical wires or links as per the technology used. In a computer program product, a signal may represent one or more variables or messages used in a transaction or in a function call or procedure call.

In some embodiments the second input LENCARRY_IN signal of the first stage may be absent or coupled to a constant value. In some other embodiments it may be coupled to an output LENCARRYOUT (hereinafter "LCO") of a storage entity called LENCARRYOVER (hereinafter "LCOVR"). The LCOVR storage entity is used to hold the value of the first output LENCARRY signal of a logic block from a preceding time cycle or iteration for use in the next time cycle or next iteration of the process. In a typical embodiment this logic block is in the last stage of the sequence of logic blocks arranged in stages. In some other embodiments this logic block may not be located in the last stage of the sequence.

In operation 208, the logic block in each stage determines, whether or not, the corresponding one or more LEN positioned bit(s) indicate a possible single syllable instruction, and further examines the second input LENCARRY_IN signal to sense a last syllable indication from a preceding stage. In this context, if the first output LENCARRY signal of the preceding stage indicates its corresponding syllable as the last syllable of an instruction then that marks the end of that instruction. If then the second input LENCARRY_IN signal at a present stage is coupled to the first output LENCARRY signal from the preceding stage it makes the present stage syllable the first syllable of a new instruction. In other words, in operation 208 if the present stage syllable is possibly a single syllable instruction, and it is actually determined to be the first syllable of an instruction then it is conclusively determined to be a single syllable instruction.

In operation 210, the logic block in each stage generates the first output LENCARRY signal to indicate whether or not it has examined the last syllable of an instruction. The generated first output LENCARRY is used to drive a coupled second input LENCARRY_IN of a succeeding stage. It may be noted that in some embodiments there may be multiple succeeding stages each with a second input LENCARRY_IN which may be driven by the first output LENCARRY.

In operation 212, the logic block at each stage generates control signals to write or indicate a single or multi-syllable instruction, and indicate an end of instruction marker. In some embodiments, a controlling logic block coupled to the logic blocks may be configured to generate these control signals.

The operation 212 is performed among other things, to generate the control signals that indicate one or more instruction boundaries; for instance, one or more control signals may mark the end of an instruction and the beginning of the subsequent instruction. These control signals may be further used to write demarcated instructions or to further decode the instructions.

Figure 3A:
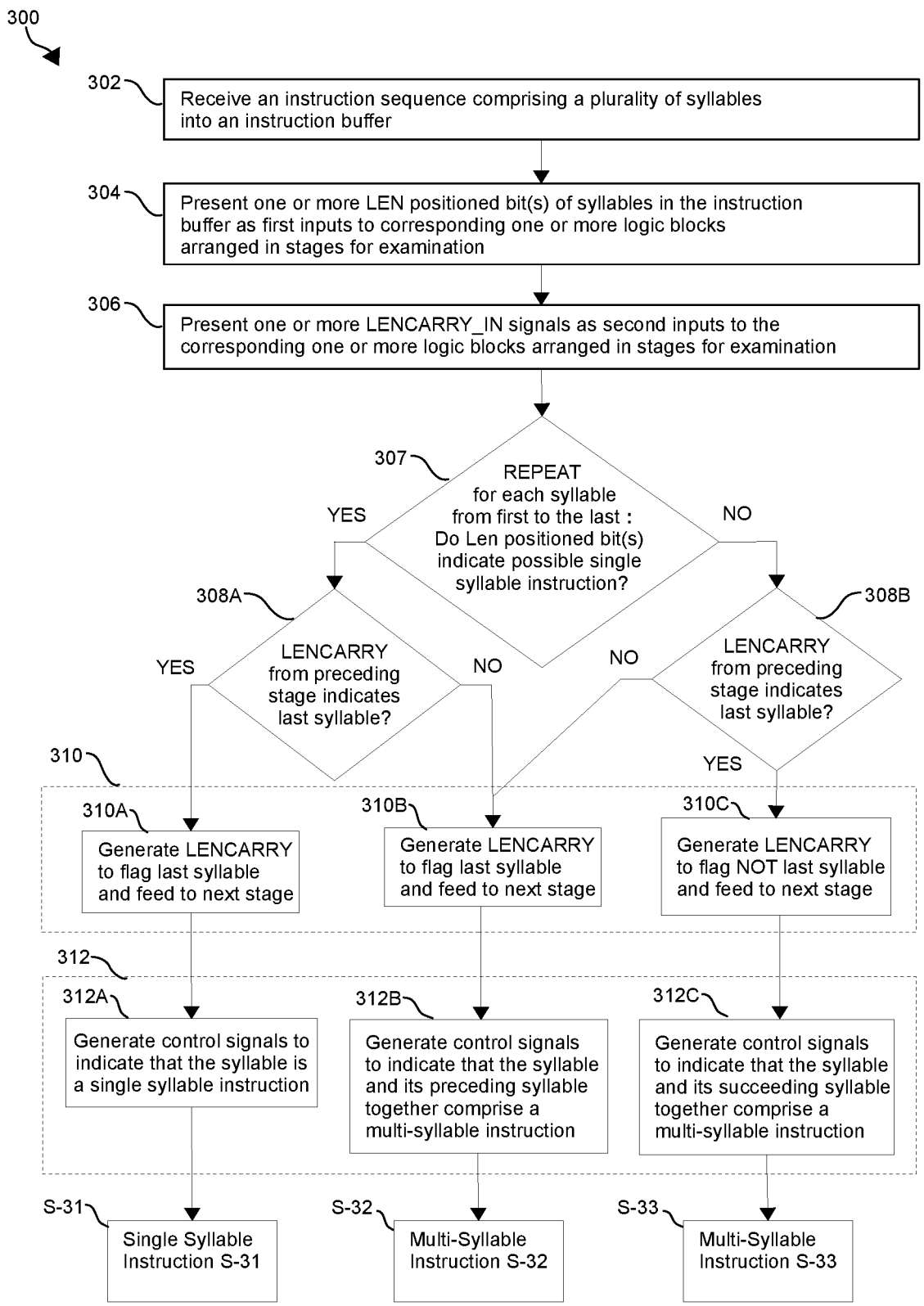
FIG. 3A illustrates a detailed method for instruction demarcation, in accordance with one possible embodiment.

FIG. 3A illustrates a detailed method 300 for instruction demarcation, in accordance with one possible embodiment. Optionally, method 300 may be implemented in the context of any of the foregoing figures.

In the method 300, in operation 302, an instruction sequence comprising a plurality of syllables is received into an instruction buffer. In the context of this description the instruction buffer refers to any storage entity that holds a sequence of one or more instructions which may be processed.

In operation 304, the LEN positioned bit(s) of syllables in the instruction buffer are presented as first inputs to corresponding one or more logic blocks arranged in stages for examination. In many embodiments the LEN positioned bit(s) may be presented concurrently and in parallel, to the one or more logic blocks arranged in stages as their first inputs.

In operation 306, one or more second inputs LENCARRY_IN signals are presented as second inputs to the corresponding one or more logic blocks arranged in stages for examination.

In this context, the second input LENCARRY_IN signal at a stage is coupled to a first output LENCARRY signal from a preceding stage, and the second input LENCARRY_IN signal of the first stage may be absent or coupled to a constant value, or it may be coupled to the output LCO of a LCOVR storage entity driven by the first output LENCARRY signal of the last stage. This LCOVR storage entity holds the value of the first output LENCARRY signal of the last stage from a preceding iteration and/or time interval.

In operation 307, for each syllable from the first to the last that is examined, the following is repeated: if the LEN positioned bit(s) of the syllable indicate a possible single syllable instruction, a YES or affirmative indicator is flagged leading to 308A; else a NO or negative indicator is flagged leading to 308B.

In operation 308A, if the first output LENCARRY signal from the preceding stage indicates last syllable of an instruction then a YES or affirmative indicator is flagged leading to operation 310A; else a NO or negative indicator is flagged leading to operation 310B.

In operation 308B, if the first output LENCARRY signal from the preceding stage indicates last syllable of an instruction then a YES or affirmative indicator is flagged leading to operation 310C; else a NO or negative indicator is flagged leading to operation 310B.

In some embodiments, in operations 308A and 308B, as the case may be, a second input LENCARRY_IN signal is received by a logic block from the first output LENCARRY signal generated by a preceding stage logic block; the logic block at each stage may use its first input of LEN positioned bit(s) and its second input LENCARRY_IN signal to determine the status of the syllable examined and generate its first output LENCARRY signal in operation 310.

In operation 310, a first output LENCARRY signal is generated by the logic block at each stage, in accordance with any one of operations 310A, 310B or 310C, whichever is applicable. In operation 310, for any syllable for which a decision in operation 308A or 308B is taken:
  if operation 310A is invoked in processing a syllable, the first output LENCARRY signal is generated to flag the syllable as the last syllable of a single syllable instruction and is fed as the second input LENCARRY_IN signal to the logic block in a succeeding stage, and therefrom operation 312A is performed;
  if instead, operation 310B is invoked in processing a syllable, the first output LENCARRY signal is generated to flag the syllable as the last syllable of a multi-syllable instruction and is fed as the second input LENCARRY_IN signal to the logic block at a succeeding stage, and therefrom operation 312B is performed;
  if instead, operation 310C is invoked in processing a syllable, the first output LENCARRY signal is generated to flag the syllable as NOT the last syllable of an instruction and is fed as the second input LENCARRY_IN signal to the logic block at a succeeding stage, and therefrom operation 312C is performed.

Figure 3B:
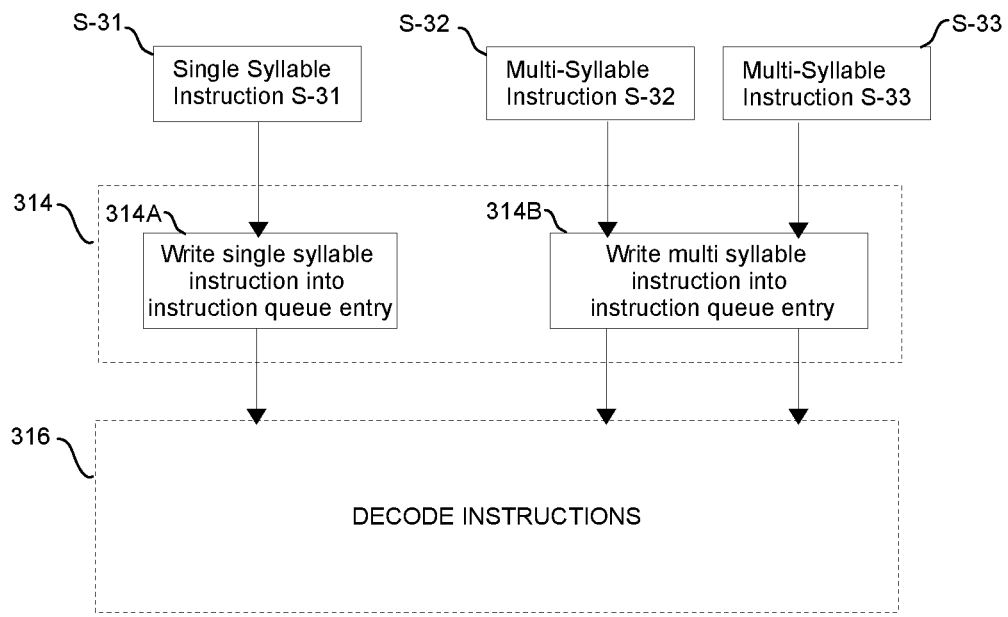
FIG. 3B illustrates one further embodiment of a method for instruction demarcation coupled to an instruction decoder function.

In operation 312, one of the following operations is performed as directed from operation 310 by a logic block:
  if operation 312A is invoked in processing a syllable, a logic block generates control signals to indicate that the syllable is a single syllable instruction; in operation 312A, a single syllable instruction S-31 is generated;
  if instead, operation 312B is invoked in processing a syllable, a logic block generates control signals to indicate that the syllable and its preceding syllable together comprise a multi-syllable instruction; in operation 312B, a multi-syllable instruction S-32 is generated;
  if instead, operation 312C is invoked in processing a syllable, a logic block generates control signals to indicate that the syllable and its succeeding syllable together comprise a multi-syllable instruction; in operation 312C, a multi-syllable instruction S-33 is generated;

In another embodiment as shown in FIG. 3B, an additional operation 314 may used after the operations 302 through 312 (FIG. 3A) to write one or more demarcated instructions into instruction queue entries. If operation 312A identifies and generates control signals for a single syllable instruction S-31, then in operation 314A (FIG. 3B), the single syllable instruction S-31 is written into an instruction queue entry; if instead, operation 312B or operation 312C are invoked to identify and generate control signals for the multi-syllable instructions S-32 or S-33, respectively, then in operation 314B, the multi-syllable instruction S-32 or S-33 (as the case may be) is written into an instruction queue entry.

One or more instructions may then be read from the instruction queue entries of operation 314 and decoded in operation 316. In some embodiments, operation 316 may coalesce some instructions to create longer instructions. In some embodiments it is also possible for a multi-syllable instruction to be broken into smaller length instructions inside a decoder in operation 316 prior to execution.

Figure 3C:
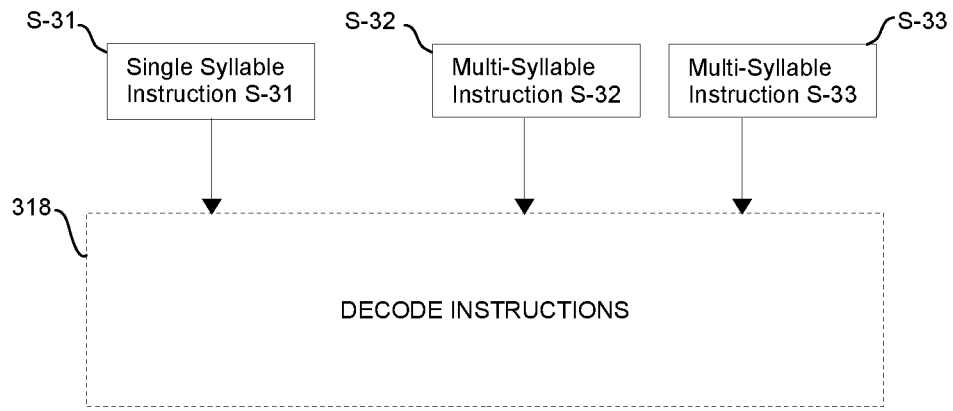
FIG. 3C illustrates an alternate method of coupling instruction demarcation with instruction decoding in accordance with one possible embodiment.

FIG. 3C illustrates one alternate method of coupling instruction demarcation with instruction decoding in accordance with one embodiment. The demarcated instructions S-31, S-32 and S-33 from operation 312 in method 300 (FIG. 3A) may be forwarded to one or more instruction decoders, bypassing an instruction queue (i.e., instead of being written into an instruction queue first), along with the generated control signals, for instruction decoding in operation 318. In some embodiment, operation 318 may coalesce some instructions to create longer instructions. In some embodiment it is also possible for a multi-syllable instruction to be broken into smaller length instructions inside a decoder in operation 318 prior to execution.

In one embodiment, LEN field and/or the first output LENCARRY signal may comprise just 1 bit each. In another embodiment, LEN field and/or the first output LENCARRY may comprise multiple bits each.

In some additional embodiments every syllable of a multi-syllable instruction may have a LEN field. In such embodiments the LEN positioned bit(s) in each syllable would be the same as the LEN field in the syllable.

In some embodiments first output LENCARRY signal and second input LENCARRY_IN signal may both have equal number of bits while in some other embodiments they may have unequal number of bits. In some further embodiments, the number of bits in first output LENCARRY signal may be different in various stages. Similarly, in some further embodiments, the number of bits in second input LENCARRY_IN signal may be different in various stages.

In some further embodiments, one or more decoupler control signals may be added as third inputs to the logic blocks at any stage to suppress or decouple the second input LENCARRY_IN signals. If a decoupler control signal to a logic block is activated (either asserted or de-asserted, as the case may be in some embodiments), the corresponding LENCARRY_IN signal may be decoupled and the first output LENCARRY of the logic block may solely depend on the corresponding LEN positioned bit(s). This may be used to start instruction demarcation from that syllable stage.

In some embodiments, a further modification to method 300 may be made to determine the boundary of multi-syllable instructions which may comprise one, two, three or more syllables, by introducing a size indicator signal. In a further embodiment, one or more other fields of an instruction may be used to determine the size of an instruction. For example, fields such as a major opcode or a secondary opcode field or an op modifier or a CoP co-processor field may be used to determine the size of an instruction.

In some embodiments a LCOVR storage entity may be used as a latch in between a first output LENCARRY from a logic block at one stage driving a second input LENCARRY_IN of a logic block in a succeeding stage.

Additionally, the number of bits used in a first output signal LENCARRY signal or in a second input LENCARRY_IN signal in each case in an embodiment is specific to its associated design and there is no limitation put forth or implied in this disclosure.

In some further embodiments, one or more logic blocks may be combined into a single or fewer enhanced logic blocks but stages may still be associated with individual syllables and the stage specific signals may be internal to the enhanced logic blocks. In yet other further embodiments some of the internal stage specific signals may be configured, combined, modified, re-combined, discarded or replaced to implement a similar or equivalent configuration.

FIG. 4A illustrates an implementation of an instruction demarcator 400, in accordance with one preferred embodiment. Optionally, instruction demarcator 400 may be implemented in the context of any of the foregoing figures. The implementation may comprise a logic circuit that can be configured to implement some or all of the functionality of methods 200 and/or 300 in FIGS. 2 and 3A respectively.

The instruction demarcator 400 in FIG. 4A comprises an instruction buffer 402 (like instruction buffer 104A in FIG. 1) and instruction demarcation logic (such as 104B in FIG. 1); the instruction demarcation logic comprises a sequence of LEN test logic blocks 440, 441, 442, 443, 444, 445, 446 and 447 (also written as 440 through 447), along with other logic such as a controlling logic block 406. The instruction demarcation logic may further comprise a LCOVR storage entity 403 comprising one or more storage elements. The LCOVR storage entity 403 also comprises an output LCO coupled to the one or more storage elements.

In some embodiments, instruction sequence is received into instruction buffer 402, via an input 405. The instruction sequence in 402 may comprise one or more instructions; each instruction comprises one or more syllables of the sequence. In some embodiments, the instruction sequence in 402 comprises syllables 410, 411, 412, 413, 414, 415, 416 and 417 ending at boundaries 420, 421, 422, 423, 424, 425, 426 and 427 respectively, by virtue of the bit positions occupied by them in the instruction buffer 402. It is to be noted that the length of 402 in an embodiment may not be limited to eight syllables as in FIG. 4A; it may be longer or shorter and may hold more or fewer syllables accordingly. In some embodiment, for each additional syllable held beyond 417, a corresponding LEN test logic block beyond 447 may be used; and the last such LEN test logic block in the sequence may then be coupled to a storage element in the LCOVR storage entity 403. Alternately, in some other embodiment, it is also possible to use an instruction buffer longer than the number of LEN test logic blocks, and use a shift and/or alignment mechanism to bring the syllables into alignment with the LEN test logic blocks prior to instruction demarcation.

In some embodiments, each LEN test logic block in sequence 440, 441, 442, 443, 444, 445, 446 and 447 may receive as its first input, the sequence of corresponding LEN positioned bit(s) 430, 431, 432, 433, 434, 435, 436 and 437 of the corresponding syllables 410 through 417, respectively. These LEN positioned bit(s) of each syllable are examined by corresponding LEN test logic blocks 440 through 447 to see whether or not each indicates the corresponding syllable as a single syllable instruction.

In one embodiment of FIG. 4A, LEN test logic blocks 440, 441, 442, 443, 444, 445, 446 and 447 each generate a corresponding first output LENCARRY signal LC-40, LC-41, LC-42, LC-43, LC-44, LC-45, LC-46 and LC-47, respectively, to indicate the end of an instruction (to indicate whether or not the logic block examined the last syllable of an instruction). The LEN test logic blocks 441 through 447 also receive a second input LENCARRY_IN signal, individually coupled to the corresponding first output LENCARRY signal LC-40, LC-41, LC-42, LC-43, LC-44, LC-45 and LC-46, respectively, as in the embodiment shown in FIG. 4A. It is seen from FIG. 4A that the second input LENCARRY_IN of each LEN test logic block in 441 through 447 is coupled to the corresponding first output LENCARRY of the preceding LEN test logic block 440 through 446. Further, the second input LENCARRY_IN of the first LEN test logic block 440 is coupled to the output LCO of the LCOVR storage entity 403A (which is same as the LCOVR storage entity 403 but in the previous time cycle/iteration). The first output LENCARRY LC-47 of LEN test logic block 447 is coupled to a data input of the LCOVR storage entity 403, which receives a LENCARRY value from the LEN test logic block 447 via the first output LENCARRY LC-47.

In one embodiment in FIG. 4A, an event marker 401A marks the end of one previous time cycle or iteration, numbered N−1 (time cycle may sometimes be referred to as a clock cycle or clock interval in the art), where N denotes the temporal sequence number of one time cycle or iteration. The value on the first output LENCARRY LC-47 of LEN test logic block 447 in time cycle or iteration N−1 denoted as first output LENCARRY LC-47A of LEN test logic block 447A (same as LEN test logic block 447 but as seen in time cycle or iteration N−1) in some embodiments. The first output LENCARRY LC-47A is received into LCOVR storage entity 403A (same as LCOVR storage entity 403 but as seen in time cycle or iteration N−1) immediately before the event 401A, and may be made available at output LCO in time cycle and/or iteration N after the event 401A. The value held in the LCOVR storage entity 403A is also called the LEN carry-over from the previous time cycle or iteration N−1. The output LCO of the LCOVR storage entity 403A indicates whether or not all syllables of an instruction were completely available in a previous time cycle. In some embodiments, 417A may be a syllable of an incomplete instruction starting at an address pointer 407A at the end of one previous time cycle or iteration N−1; the output LCO would then flag the determination of an incomplete instruction comprising syllable 417A. In one embodiment shown in FIG. 4A, LEN test logic blocks 441 through 447 may use their first and second inputs to compute their first outputs LENCARRY LC-41 through LC-47 and feed them to their corresponding succeeding LEN test logic blocks or to the LCOVR storage entity 403A to indicate whether or not the corresponding syllables 411 through 417 respectively, are the last syllables of instructions in 402 in one time cycle or iteration.

In some embodiments, the first output LENCARRY from the last LEN test logic block examining the last syllable in a sequence may be stored and forwarded to the next time cycle as the output LCO of a LCOVR storage entity and fed to the first stage LEN test logic block as its second input LENCARRY_IN in order to signal an incomplete last instruction in the previous time cycle or iteration. In some other embodiments the last syllable in the instruction buffer 402 may be guaranteed to complete an instruction by design/specification, by the designer and/or programmer and/or compiler; and the first LEN test logic block 440, in FIG. 4A, may ignore or remove its second input LENCARRY_IN altogether; therefore, it may simply examine the first syllable of an instruction by not using the output LCO of the LCOVR storage entity 403 at all; the LCOVR storage entity 403 may then be completely removed from the implementation.

In some embodiments the LENCARRY_IN of the first stage LEN test logic block may be tied to a constant value 0 or 1 or be absent. In a further embodiment the LCOVR storage entity 403 may not be used and its output LCO may not be generated. In yet other embodiments, all instruction placements may be address aligned to the word-length of the instruction as commonly understood in the art. In some embodiments all 2 syllable instructions may be address aligned to even syllable boundaries.

In some embodiments the syllable of an instruction that is not completely demarcated in a preceding time cycle/iteration is also stored in a storage entity (not shown) (similar to the LCOVR storage entity) and transmitted in a following time cycle/iteration as input to the controlling logic block 406 using an carryover syllable bus 408.

In one embodiment of FIG. 4A, the controlling logic block 406 receives syllables 410 through 417 from instruction buffer 402 along with first output LENCARRY signals LC-40, LC-41, LC-42, LC-43, LC-44, LC-45, LC-46, and LC-47. It may also receive the output LCO of the LCOVR storage entity 403A. During one time cycle or iteration, based on the inputs received, the controlling logic block 406 may generate values for control signals comprising 450, 451, 452, 453, 454, 455, 456 and 457 to write, label and/or forward the syllables of the demarcated instructions on data buses comprising 460, 461, 462, 463, 464, 465, 466 and 467, to one or more instruction queues or to one or more instruction decoders or to the consumer of these signals and buses. Further, in any embodiment, one or more control signals may be used to control the further use of each demarcated instruction.

Figure 4B:
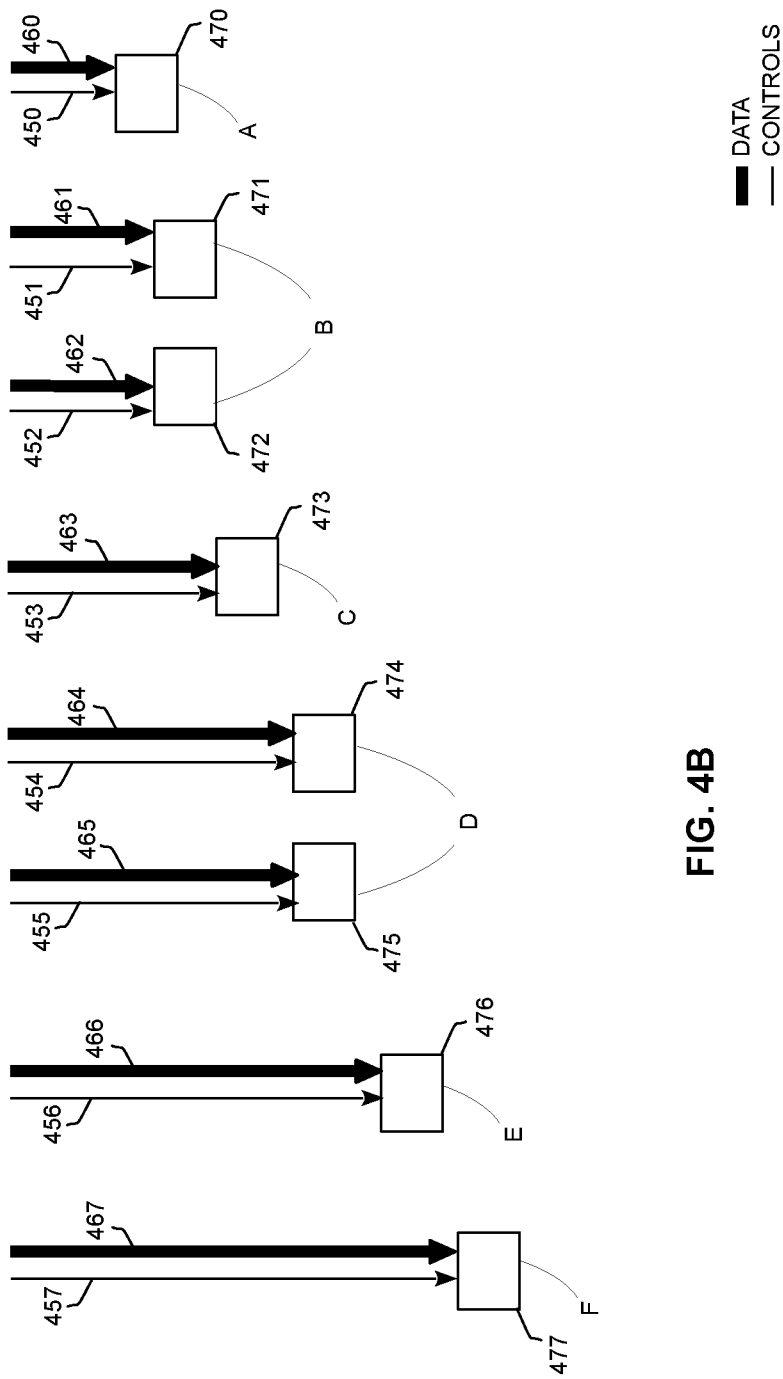
FIG. 4B illustrates one configuration for storing demarcated instructions, in accordance with one possible embodiment.

FIG. 4B illustrates one configuration for storing demarcated instructions, in accordance with one possible embodiment. In this embodiment, an instruction queue comprising a plurality of queue storage entries (henceforth "instruction queue entries") 470, 471, 472, 473, 474, 475, 476 and 477 may be used to receive the syllables on data buses 460, 461, 462, 463, 464, 465, 466 and 467 of the individually demarcated instructions from controlling logic block 406 (FIG. 4A). In some embodiments an instruction queue comprises a plurality of instruction queue entries each of which comprises a plurality of storage elements. An instruction queue entry holds an instruction till the instruction can be used by a decoder or other similar latter stage functional unit at which point the instruction queue entry may be freed up for reuse. In some embodiments the syllables of demarcated instructions may be written into the instruction queue entries comprising 470 through 477 using the control signals comprising 450, 451, 452, 453, 454, 455, 456 and 457, respectively. Optionally, this configuration may be implemented in the context of any of the foregoing figures. In some embodiments of FIGS. 4A and 4B, in one time cycle or iteration, the syllables on data buses 460 through 467 are shown demarcated into instructions A, B, C, D, E and F which are written into instruction queue entries 470 though 477. In some embodiments the instruction queue entries such as 470 through 477 that receive valid instruction syllables may be marked by a 'valid' flag driven using the associated control signal, while others that do not receive valid syllables may be tagged 'invalid' using their associated control signals. In some further embodiments, an instruction with smaller number of syllables may be prefixed or suffixed using a constant value such as 0 when it is stored into an instruction queue entry; in some embodiments, a single syllable instruction may be 0-extended to the length of the instruction queue entry which may be 2 or more syllables wide.

Figure 4C:
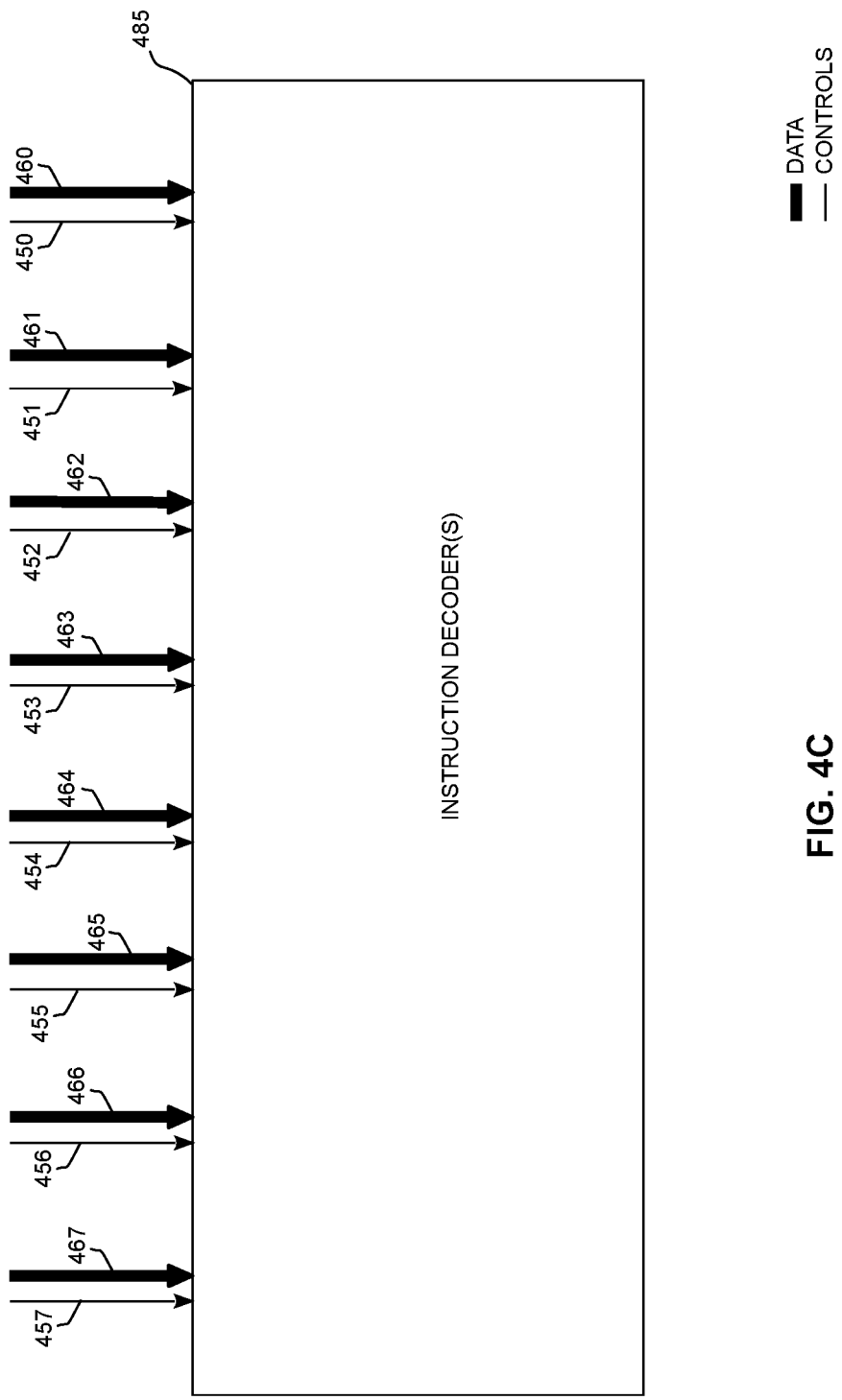
FIG. 4C illustrates a configuration to use an instruction demarcator with an instruction decoder, in accordance with one possible embodiment.

FIG. 4C illustrates a configuration to use an instruction demarcator with an instruction decoder, in accordance with one possible embodiment. Optionally, this configuration may be implemented in the context of any of the foregoing figures. In one embodiment shown in FIG. 4C, the syllables of the demarcated instructions on buses comprising 460, 461, 462, 463, 464, 465, 466 and 467 under the control of control signals comprising 450, 451, 452, 453, 454, 455, 456 and 457 may be forwarded to one or more instruction decoders 485 directly, instead of being written into an instruction queue, for further decoding. In some embodiments the control signals indicate the end of an instruction. In some embodiments, the control signals may indicate whether the syllable is a single syllable instruction or whether it is part of a multi-syllable instruction, thereby, possibly directing them appropriately to a single syllable instruction decoder or a multi-syllable instruction decoder.

It may be noted that in any embodiment, one or more LEN test logic blocks in the sequence 440 through 447 may be combined in an implementation. In a further embodiment, the controlling logic block 406 may be combined with one or more LEN test logic blocks 440 through 447 or any of their combinations thereof. Additionally, the controlling logic block 406 may further comprise multiplexers and de-multiplexers and other logic to couple data buses such as 460 through 467 to the correctly demarcated instruction syllables (or to constant values such as a 0) using one or more methods described earlier.

Figure 5A:
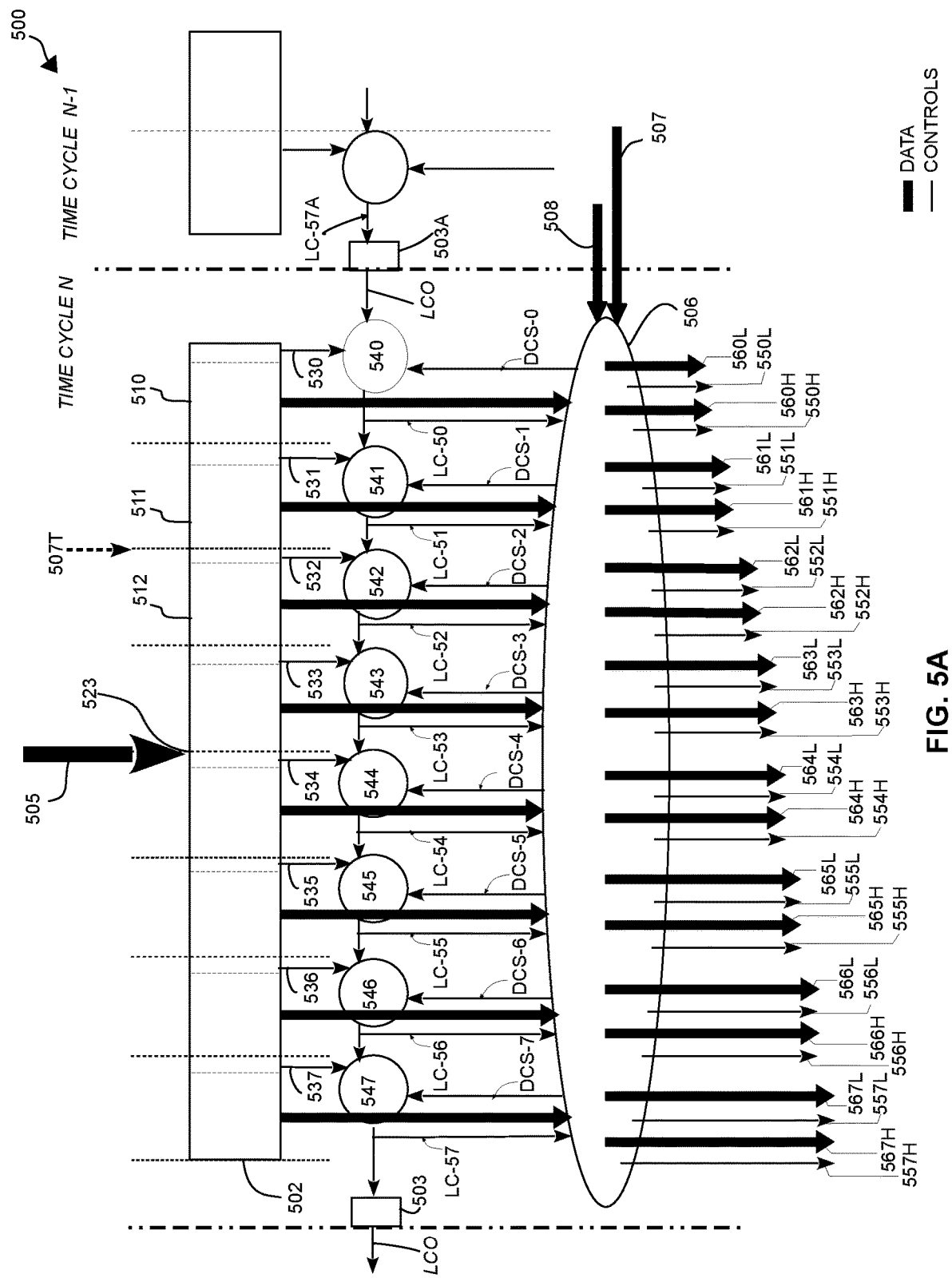
FIG. 5A illustrates an enhanced instruction demarcator, implemented in accordance with one preferred embodiment.

FIG. 5A illustrates an enhanced instruction demarcator 500 with an enhancement over demarcator 400 (FIG. 4A) that enables instruction demarcation from any specified target syllable in an instruction buffer, in accordance with one embodiment. Optionally, this enhanced instruction demarcator 500 may be implemented in the context of any of the foregoing figures.

In one embodiment shown in FIG. 5A, the enhanced instruction demarcator 500 comprises a sequence of enhanced logic blocks 540 through 547 which comprise additional inputs and additional logic to allow instruction demarcation to restart at any syllable in the instruction buffer. The enhanced logic blocks 540 through 547 take as first inputs the LEN positioned bit(s) 530 through 537. The enhanced logic blocks 540, 541, 542, 543, 544, 545, 546 and 547 generate first output LENCARRY signals LC-50, LC-51, LC-52, LC-53, LC-54, LC-55, LC-56, and LC-57, respectively, to indicate the end of an instruction. The enhanced logic blocks 541 though 547 also take as second inputs LENCARRY_IN signals driven by first output LENCARRY signals LC-50, LC-51, LC-52, LC-53, LC-54, LC-55, and LC-56, respectively. The second input LENCARRY_IN of the enhanced logic block 540 may be coupled to and controlled by the output LCO of a LCOVR storage entity 503A (LCOVR storage entity 503 as seen in one previous time cycle or iteration). Further, the enhanced logic blocks 540, 541, 542, 543, 544, 545, 546 and 547 each takes an additional corresponding third input called a decoupler control signal (DCS) presented in the sequence DCS-0, DCS-1, DCS-2, DCS-3, DCS-4, DCS-5, DCS-6, and DCS-7, respectively, in order to optionally decouple the corresponding enhanced logic block from its second input LEN-CARRY_IN, when the corresponding third input decoupler control signal is activated (either asserted or de-asserted, as the case may be in some embodiments). When a third input decoupler control signal to an enhanced logic block is activated the value of the second input LENCARRY_IN to that enhanced logic block is not used in the computation of the first output LENCARRY of that enhanced logic block, and it is as if that second input LENCARRY_IN is absent or ineffective.

In one embodiment shown in FIG. 5A, a controlling logic block 506 receives a target address input 507 comprising one or more bits which may be used to generate and drive the decoupler control signals DCS-0 through DCS-7. The target address on target address input 507 is an address used to identify the syllable (target instruction syllable) from which the next/subsequent instruction demarcation must restart immediately after redirection of an execution thread (i.e. executing program thread). In some embodiments the target address may be given by the instruction pointer ('instruction pointer' is also known in the art as 'program counter'). In some embodiments, redirection of an execution thread may occur during program execution as a result of a subroutine/procedure/function calls, branches such as conditional or unconditional jumps, interrupts, hardware and/or software and/or system generated exceptions, returns from calls, machine generated exceptions not limited to aborts, faults, traps, redirection due to mis-predictions and/or speculation, among others. A target instruction syllable becomes the starting syllable of a redirected execution thread after the thread of sequential execution is redirected away from some previous instruction address in the program sequence to a new target instruction address that may or may not be sequentially the next instruction address. In some embodiments a target equivalent address that is derived from the target address (and used in lieu of the target address) may be driven on the target address input 507 to identify a target instruction syllable in one time cycle or iteration; then, the controlling logic block 506 uses the target equivalent address to generate and drive the decoupler control signals DCS-0 through DCS-7. In some embodiments, a target equivalent address may be a partial address (or equivalent) of the target instruction syllable comprising one or more address bits of the target address in a time cycle or iteration that identifies the target instruction and its target instruction syllable. In some embodiments the target equivalent address may be the pointer or a portion of the pointer to an instruction in the instruction cache line held in the instruction buffer in a time cycle. In some further embodiments, the target address input 507 may be processed at least in part by the enhanced logic blocks 540 through 547.

In one embodiment shown in FIG. 5A, when instruction execution in a time cycle starts from an instruction not aligned at the first syllable in the instruction buffer 502 due to redirection of an execution thread then the target address 507T (driven on target address input 507) causes the execution thread to restart instruction demarcation process from (and including) target instruction syllable 512 onward. All preceding syllables (such as 511 and 510) in that instruction buffer 502 may not then be used to determine that target instruction's boundary. If an enhanced logic block accepts the first syllable of that target instruction 507 then this enhanced logic block's second input LENCARRY_IN would need to be decoupled from the first output LENCARRY of the preceding enhanced logic block it is coupled to, by activating (either asserting or de-asserting as the case may be) a decoupler control signal generated by the controlling logic block 506 temporarily in that time cycle; then the instruction may be examined as if it is the first instruction in a sequence starting at that address 507, ignoring the effect of preceeding syllables (such as 511 and 510).

In some embodiments the syllable of an instruction that is not completely demarcated in a preceding time cycle/iteration is also stored in a storage entity (not shown) (similar to the LCOVR storage entity) and transmitted in a following time cycle/iteration as input to the controlling logic block 506 using an carryover syllable bus 508.

Figure 5B:
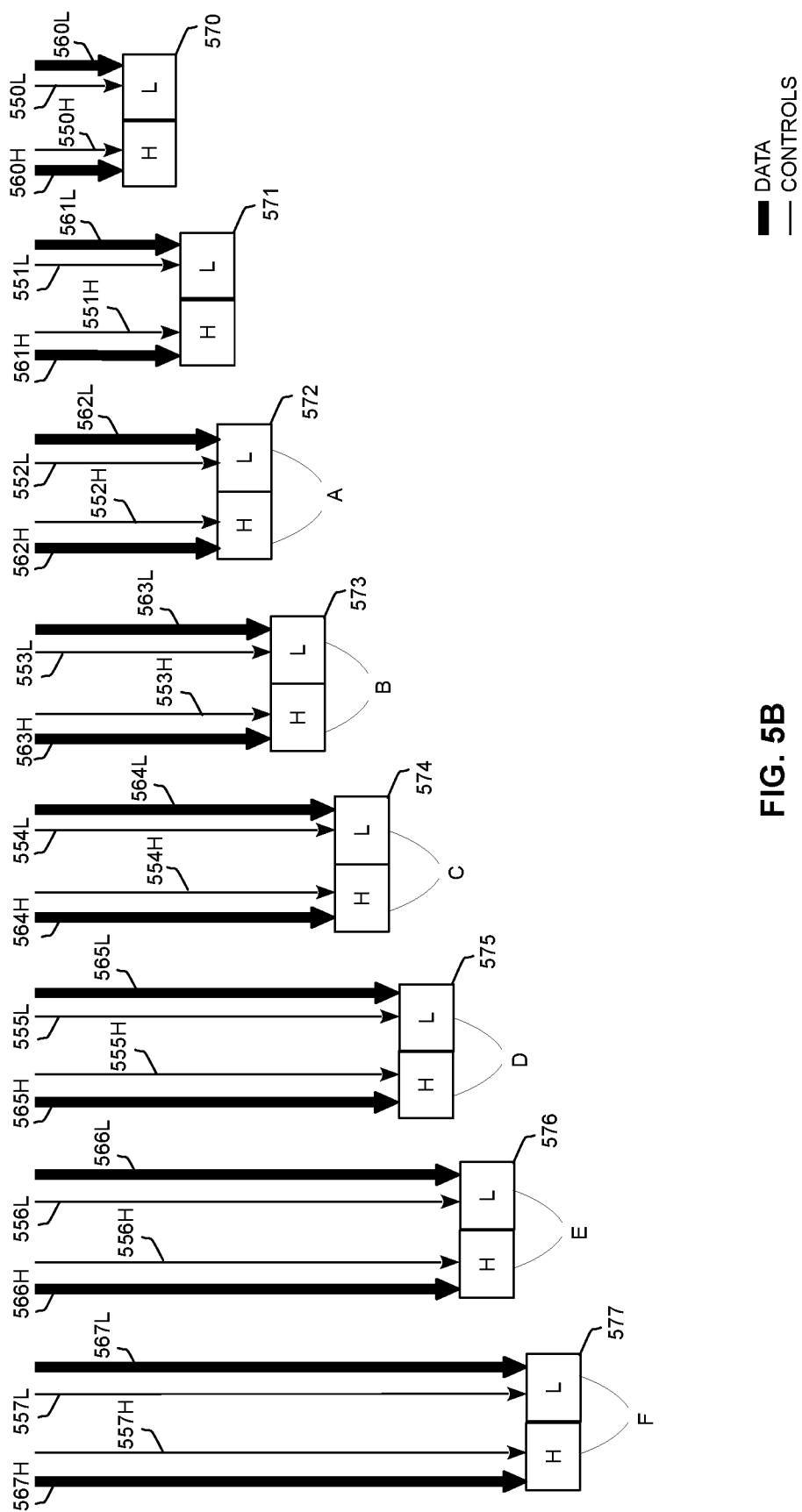
FIG. 5B illustrates one further configuration for storing demarcated instructions, in accordance with one possible embodiment.

FIG. 5B illustrates one further configuration for storing demarcated instructions, in accordance with some possible embodiments. In some embodiments instruction demarcator 500 (of FIG. 5A) is configured to send values into an instruction queue comprising a plurality of instruction queue entries 570, 571, 572, 573, 574, 575, 576, 577 via corresponding pairs of data buses comprising 560H & 560L, 561H & 561L, 562H & 562L, 563H & 563L, 564H & 564L, 565H & 565L, 566H & 566L and 567H & 567L, respectively, and controlled by corresponding pairs of control signals comprising 550H & 550L, 551H & 551L, 552H & 552L, 553H & 553L, 554H & 554L, 555H & 555L, 556H & 556L and 557H & 557L, respectively. In some embodiments only one control signal may be used in lieu of a pair of control signals. In some embodiments the instruction queue may comprise many more entries than 570 through 577, and further comprise control logic (not shown) to read and write data into various instruction queue entries. In one embodiment of FIG. 5B, each instruction queue entry 570 through 577 comprises two portions—a high syllable H and a low syllable L—which receive values from the H and L data buses 560H, 560L through 567H, 567L, respectively. Each may hold the higher and lower syllables of one two syllable instruction. In the alternative, the only syllable of a single syllable instruction may be written into one portion (L or H) of an instruction queue entry while the other portion (H or L) may possibly receive a '0' value.

In some embodiments of FIGS. 5A and 5B, suppose that in some time cycle a redirection of an execution thread leads to a target address corresponding to the address of a target instruction A with its first syllable 512 (referred to as a target syllable), then a corresponding target equivalent address 507T may be generated and driven on input 507; consequently, the controlling logic block 506 causes the decoupler control signal DCS-2 coupled to the enhanced logic block 542 as its third input to be activated; this causes the enhanced logic block 542 to decouple its second input LENCARRY_IN LC-51. Consequently, syllable 512 is treated as the first syllable of target instruction A by the enhanced logic block 542 regardless of the value on its second input LENCARRY_IN LC-51 in that time cycle. The LEN field syllable 512 may then be used in determining the boundary of the target instruction A comprising syllable 512 without regard for the second input LENCARRY_IN LC-51. Consequently, in this example, instructions A, B, C, D, E and F are demarcated and stored in instruction queue entries 572 through 577. In some embodiments, the syllables 510 and 511 may be ignored, and instruction queue entries 570 and 571 may or may not be filled. In some embodiments instruction queue entries 570 and 571 may be marked invalid and discarded, and/or bypassed.

In some embodiments of FIGS. 5A and 5B the instruction queue entries 570 through 577 are demarcated such that each of them can be individually addressed and accessed and more than one may be accessed concurrently, and in parallel, if so desired. Further, in some embodiments the instruction queue entries may comprise other control and address fields as may be required by one implemented design.

Figure 5C:
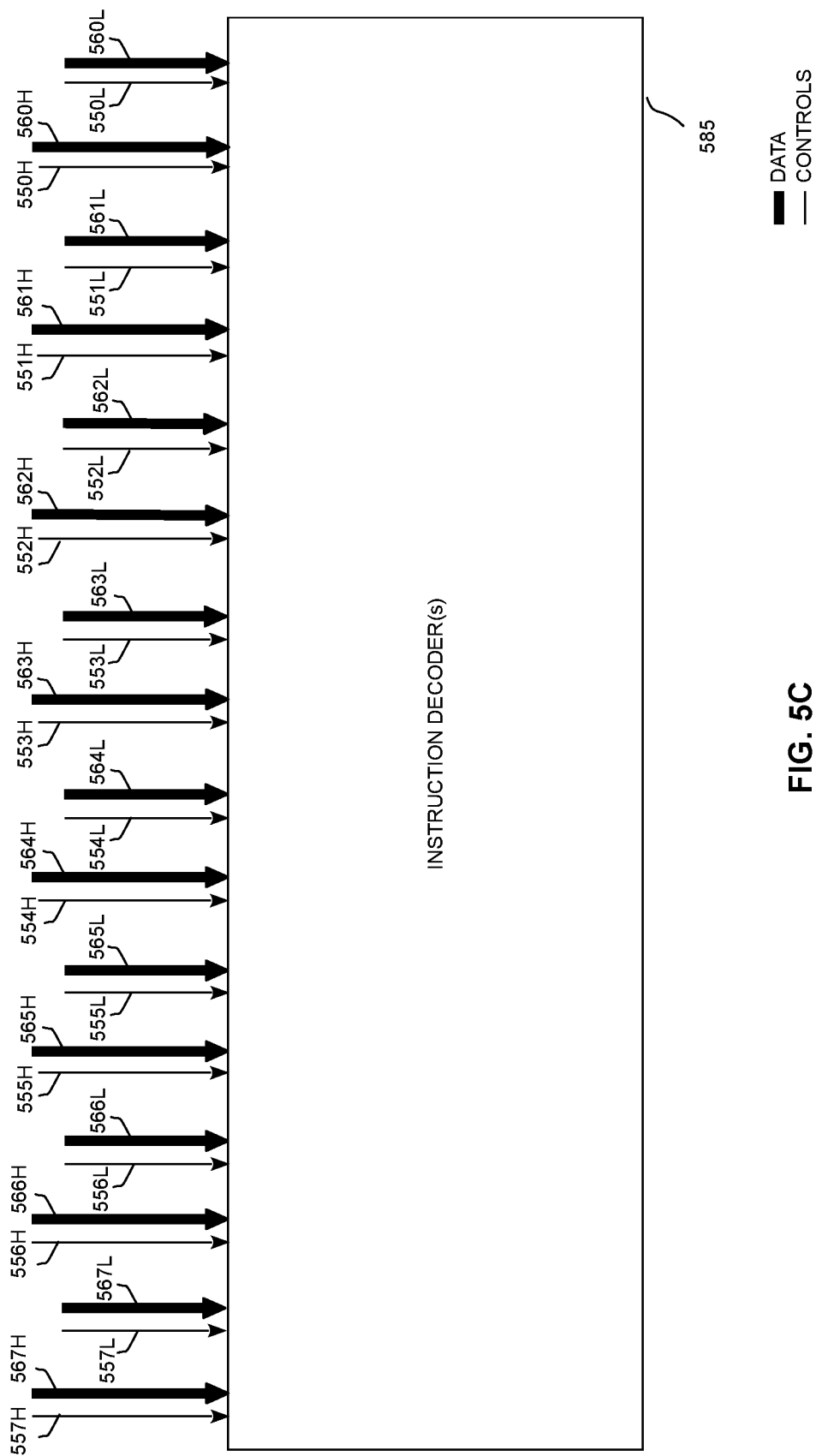
FIG. 5C illustrates one further configuration to couple an instruction demarcator with instruction decoder(s), in accordance with one possible embodiment.

In some embodiments, the instruction demarcator 500 (FIG. 5A) may be directly coupled to one or more instruction decoder(s) 585 as in FIG. 5C, which may receive demarcated instructions using pairs of data buses comprising 560H & 560L, 561H & 561L, 562H & 562L, 563H & 563L, 564H & 564L, 565H & 565L, 566H & 566L and 567H & 567L, and controlled using corresponding pairs of control signals 550H & 550L, 551H & 551L, 552H & 552L, 553H & 553L, 554H & 554L, 555H & 555L, 556H & 556L and 557H & 557L, respectively.

Figure 6A:
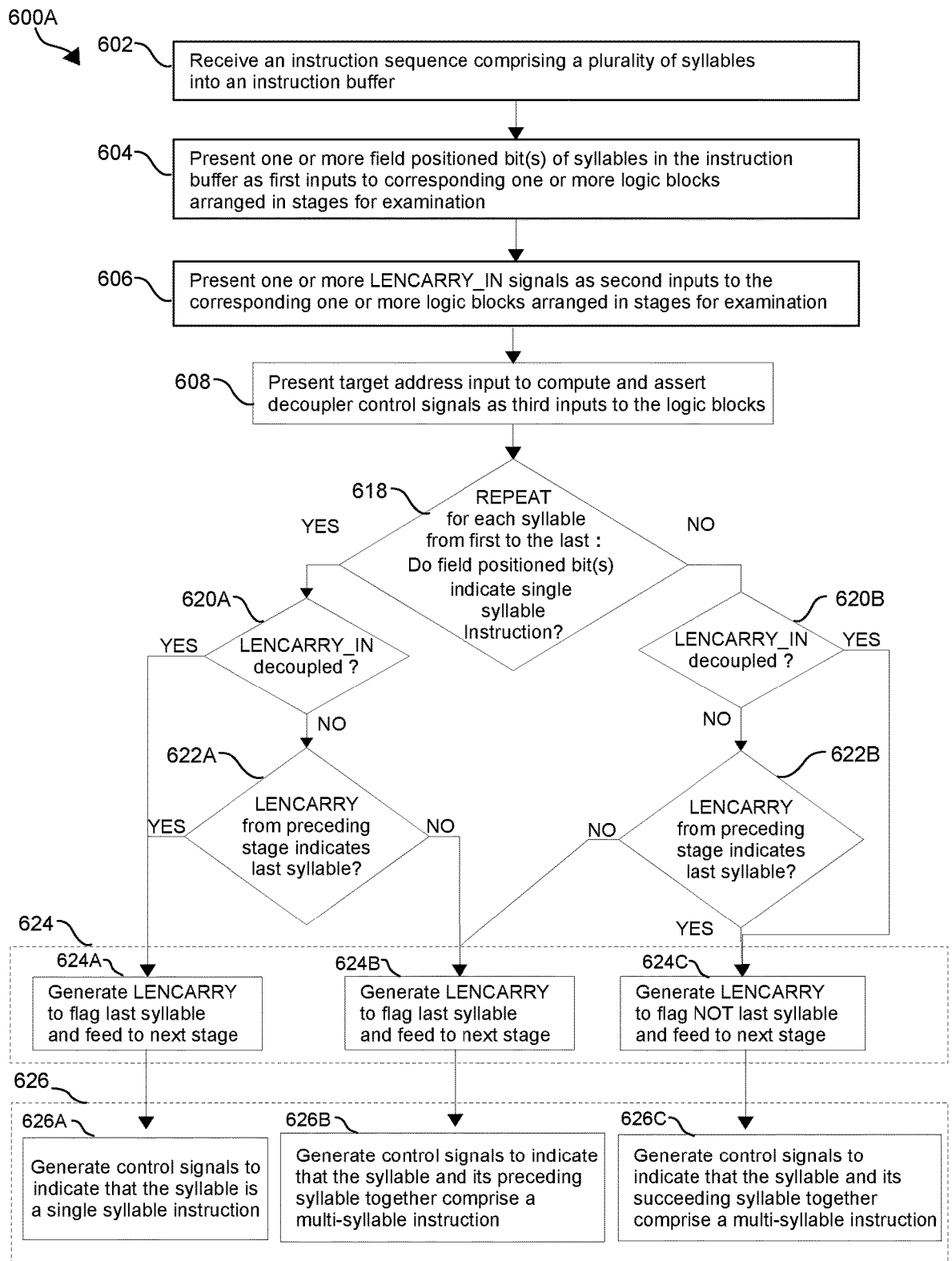
FIG. 6A illustrates an enhanced method for instruction demarcation using decoupler control signals, in accordance with one preferred embodiment.

FIG. 6A shows an enhanced method 600A for instruction demarcation using decoupler control signals, in accordance with one embodiment. Optionally, method 600A may be implemented in the context of any of the foregoing figures. In operation 602 of method 600A, an instruction sequence comprising a plurality of syllables is received into an instruction buffer.

In some embodiments, an instruction demarcator may use one or more fields of an instruction in conjunction with the LEN field for instruction demarcation. The bit positions occupied by these one or more fields in a syllable are referred to as 'field positioned bit(s)' (similar to the LEN positioned bit(s)). In some embodiments these fields may comprise a major opcode field, a secondary opcode field, an op modifier field, a co-processor field, the LEN field, an ISA field (used to define a subset of an instruction set), and/or some other size related field of an instruction; these fields may be used to determine the length or size of the instruction for instruction demarcation. In operation 604, one or more field positioned bit(s) of syllables in the instruction buffer are presented as first inputs to one or more logic blocks arranged in stages for examination. In some embodiments, the field positioned bit(s) may be presented concurrently and in parallel, to the one or more logic blocks arranged in stages.

In operation 606, one or more LENCARRY_IN signals are presented as second inputs to the corresponding one or more logic blocks arranged in stages for examination. In this context, the second input LENCARRY_IN at a stage is coupled to a first output LENCARRY signal from a preceding stage which is generated to indicate the end of an instruction in the preceding stage; and the second input LENCARRY_IN of the first stage may be absent or coupled to a constant value, or be coupled to the output of a LCOVR storage entity. The LCOVR storage entity holds the value of the first output LENCARRY from a logic block from a preceding time cycle or iteration.

In operation 608, a target address input is presented to compute and assert one or more decoupler control signals (DCS) as third inputs to the logic blocks. In some embodiments, the target address may be an instruction pointer value which may provide the address of the next instruction to be executed in a program execution thread. In some embodiments the target address input is presented to a controlling logic block to compute the decoupler control signals while in some other embodiments that logic may be included into the logic blocks receiving their first inputs from the syllables in the instruction buffer. Further, in some embodiments the target address input may receive a full instruction pointer holding the address of the next instruction; in some embodiments, a partial address of the next instruction, or some equivalent address derived from the instruction pointer may be used as input instead. One or more decoupler control signals when asserted (or de-asserted in some embodiments) may be used to decouple the corresponding second input LENCARRY_IN signals to a logic block and render them to a default deasserted state disabling their efficacy in computing the corresponding first output LENCARRY of the logic block.

In operation 618, for each syllable from the first to the last that is examined the following is repeated: if the field positioned bit(s) of a syllable indicate a single syllable instruction, a YES or affirmative indicator is flagged leading to a decision in operation 620A; or else a NO or FALSE indication is flagged leading to a decision in operation 620B.

In operation 620A, if the third input decoupler control signal to a logic block at a stage is asserted then the corresponding second input LENCARRY_IN (and therefore, the preceding first output LENCARRY coupled to it) at that stage is decoupled in the logic block, and consequently a YES is flagged leading to operation 624A of operation 624; or else a NO is flagged leading to a decision in operation 622A.

In operation 620B, if the third input decoupler control signal to a logic block at a stage is asserted then the corresponding second input LENCARRY_IN (and therefore, the preceding first output LENCARRY coupled to it) at that stage is decoupled in the logic block, and consequently a YES is flagged leading to operation 624C of operation 624; or else a NO is flagged leading to a decision in operation 622B.

In operations 624A and 624B, a logic block at a stage generates its first output LENCARRY to flag whether or not it has received and examined a last syllable (indicating the end of an instruction). In operation 624C a logic block at a stage generates its first output LENCARRY to flag that it has NOT received the last syllable. The generated LENCARRY in each stage may be fed to the next stage.

In operation 626A, a logic block at a stage generates control signals to indicate that the syllable is a single syllable instruction. In operation 626B, a logic block at a stage generates control signals to indicate that the corresponding current stage syllable and its preceding stage syllable together comprise a multi-syllable instruction. In operation 626C, a logic block at a stage generates control signals to indicate that the corresponding current stage syllable and its succeeding stage syllable together comprise a multi-syllable instruction. It may be noted that in some embodiments operations 624A, 624B and 624C of operation 624 may be combined into one or more operations. Further, operations 626A, 626B and 626C of operation 626 may also be combined into one or more operations in some embodiments. In some further embodiments, any of the operations in method 600A may be combined without changing the overall functionality of the method.

Figure 6B:
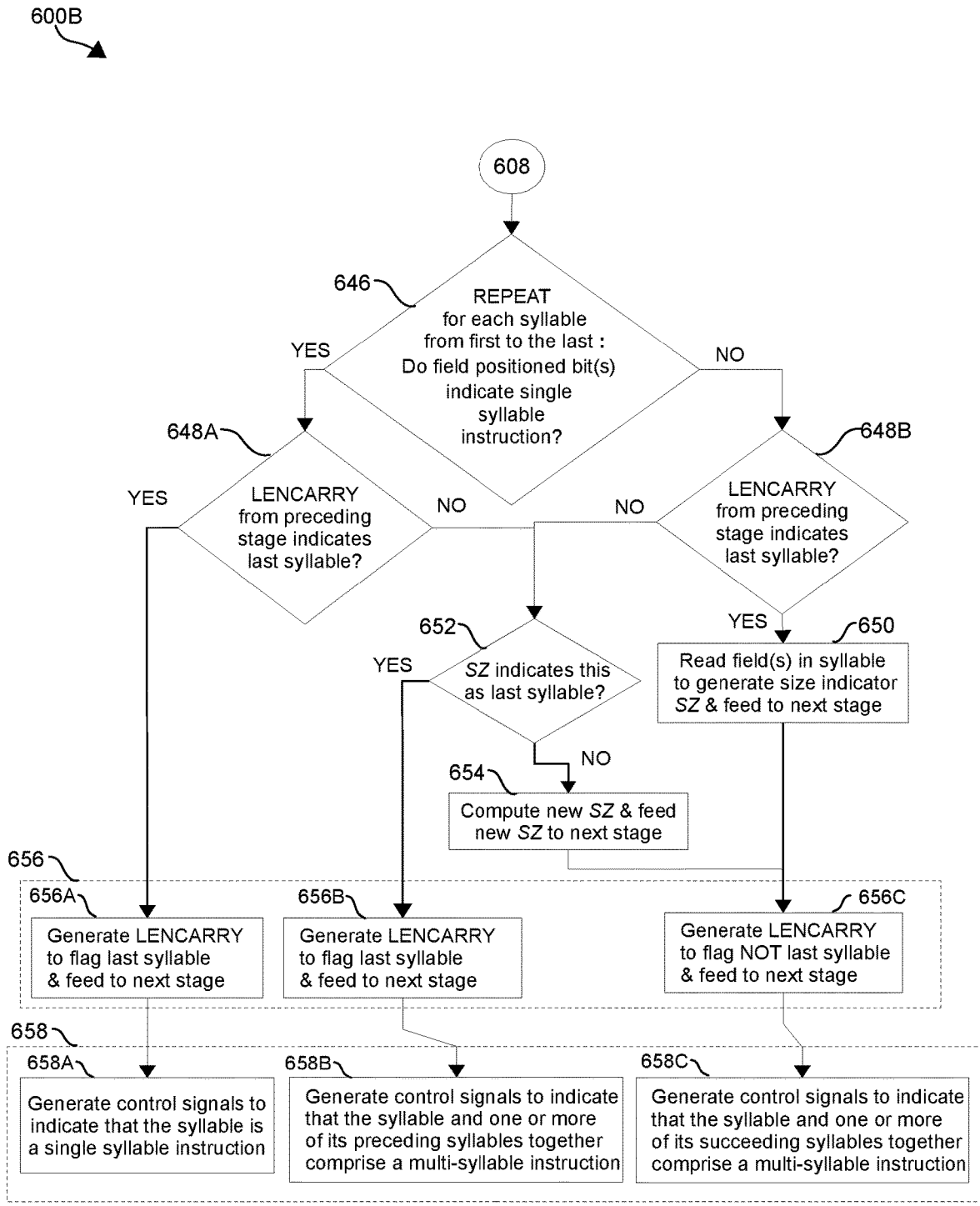
FIG. 6B illustrates an enhanced method for instruction demarcation using size, in accordance with one possible embodiment.

FIG. 6B shows a method 600B for instruction demarcation applicable to instruction sequences comprising instructions of lengths one, two, three, four or more syllables, in accordance with one embodiment. It involves computation of a size indicator SZ from one or more syllables which is used in instruction demarcation. Optionally, method 600B may be implemented in the context of any of the foregoing figures. In some embodiments, one or more fields of an instruction may be used to determine the size of an instruction in a machine that uses instructions of one, two, three or more syllables. For instance, in some embodiments, any combination of one or more fields variously referred to as 'field positioned bit(s)' of syllables as mentioned earlier (similar to the LEN positioned bit(s)) may be used to determine the boundary of an instruction. The method 600B uses one or more field positioned bits of an instruction to determine the size of an instruction and/or demarcate the instruction from its adjacent instruction(s).

In some embodiments, after the operations 602, 604, 606 and 608 (FIG. 6A) are completed using field positioned bit(s) of syllables, in operation 646 of method 600B, each syllable from the first to the last that is examined the following is repeated: if the field positioned bit(s) of a syllable indicate a single syllable instruction then a YES or affirmative indicator is flagged by a logic block leading to a decision in operation 648A; or else, a negative or FALSE indication is flagged leading to a decision in operation 648B.

In operation 648A, if the corresponding first output LEN-CARRY from the preceding stage indicates that the preceding stage syllable was the last syllable of an instruction then a YES is flagged by a logic block leading to operation 656A; or else a NO is flagged leading to a decision in operation 652. In operation 648B, if the corresponding first output LENCARRY from the preceding stage indicates that the preceding stage syllable was the last syllable of an instruction then a YES is flagged by a logic block leading to operation 650; or else a NO is flagged leading to a decision in operation 652.

In operation 650, one or more field position bits of the first syllable in an instruction may be read as input(s) by one or more logic blocks to generate a size indicator SZ indicating the size of the instruction. The value of size indicator SZ is fed to the logic block in the next stage, thereafter leading to operation 656C.

In operation 652, if the size indicator SZ reaches a terminal value that indicates that the syllable under examination is the last syllable of an instruction then a logic block invokes operation 656B; or else the logic block invokes operation 654.

In operation 654, a new value of the size SZ is computed and fed to the next stage logic block, thereafter leading to operation 656C. In some embodiments, the size indicator SZ may use 2-bit values as follows: 00 indicates a single syllable instruction or last syllable of an instruction deemed completely demarcated; 01 indicates a two syllable instruction or an instruction not yet completely demarcated; 10 indicates a three syllable instruction or an instruction not yet completely demarcated; 11 indicates a four syllable instruction or an instruction not yet completely demarcated. In this case, 00 becomes the terminal value. In this embodiment the size indicator SZ is initialized in operation 650; in operation 654 the new value of size size indicator SZ is computed by a logic block by decrementing it; this is done for each syllable till the size indicator SZ reaches the terminal value 00 as tested by a logic block in operation 652. In some embodiments the initial size indicator SZ value may simply be taken from the bits of the LEN field and/or an op field and/or an op modifier field in operation 650.

In some embodiments size indicator SZ may be implemented using 3-bit or 4-bit values or may use a different encoding than the one showed earlier. In some embodiments size indicator SZ may use the following values: 0001, 0010, 0100 & 1000 to indicate single syllable, two syllable, three syllable and four syllable instructions, respectively, with 0001 as the terminal value. The new value of size indicator SZ may then be computed by a logic block by shifting the SZ values right for each syllable (operation 654) till the terminal value 0001 is reached (as tested in operation 652). The values used for size indicator SZ in one embodiment are merely artifacts of the embodiment; they may be initialized in operation 650; and they may be modified by some method specific to that embodiment in operation 654; and may be compared in operation 652 at one or more stages. In some embodiments the size indicator SZ may be incremented by some value in operation 654. Regardless of what exact mechanism is employed in operations 650, 652 and 654, the size indicator SZ is used to determine the boundary of an instruction using a terminal condition in operation 652.

In operation 656, the corresponding first output LEN-CARRY is generated at each stage by the logic block, in accordance with one of operations 656A, 656B, 656C, whichever is applicable to indicate whether or not the logic block examined the last syllable of an instruction (indicating the end of an instruction). Operations 656A, 656B and 656C are similar to operations 624A, 624B and 624C, respectively, of method 600A.

In operation 658, a following operation is performed as directed from operation 656 by a logic block:
if operation 658A is invoked in processing a syllable, then control signals are generated by a logic block to indicate that the syllable is a single syllable instruction;
if instead, operation 658B is invoked in processing a syllable, control signals are generated by a logic block to indicate that the syllable and its one or more preceding syllable(s) up to the instruction's boundary together comprise a multi-syllable instruction;
if instead, operation 658C is invoked in processing a syllable, control signals are generated by a logic block to indicate that the syllable and its one or more succeeding syllable(s) together comprise a multi-syllable instruction;

It may be noted that in some embodiments any of the operations 656A, 656B and 656C may be combined into one or more operations. Similarly, in an embodiment, any of the operations 658A, 658B, 658C may be combined with each other and/or with one or more of other operations in their implementation. In some further embodiments any one or more of the operations in method 600B may be combined.

In some embodiments, method 600B of FIG. 6B may comprise additional operations. If a single syllable instruction is identified in operation 658A then the single syllable instruction may be written into an instruction queue entry; else if in operation 658B or 658C of method 600B, a multi-syllable instruction is identified then the multi-syllable instruction may be written into an instruction queue entry. In some other embodiments the syllables and control signals from operation 658 after instruction demarcation may be forwarded directly to one or more instruction decoders.

Figure 7A:
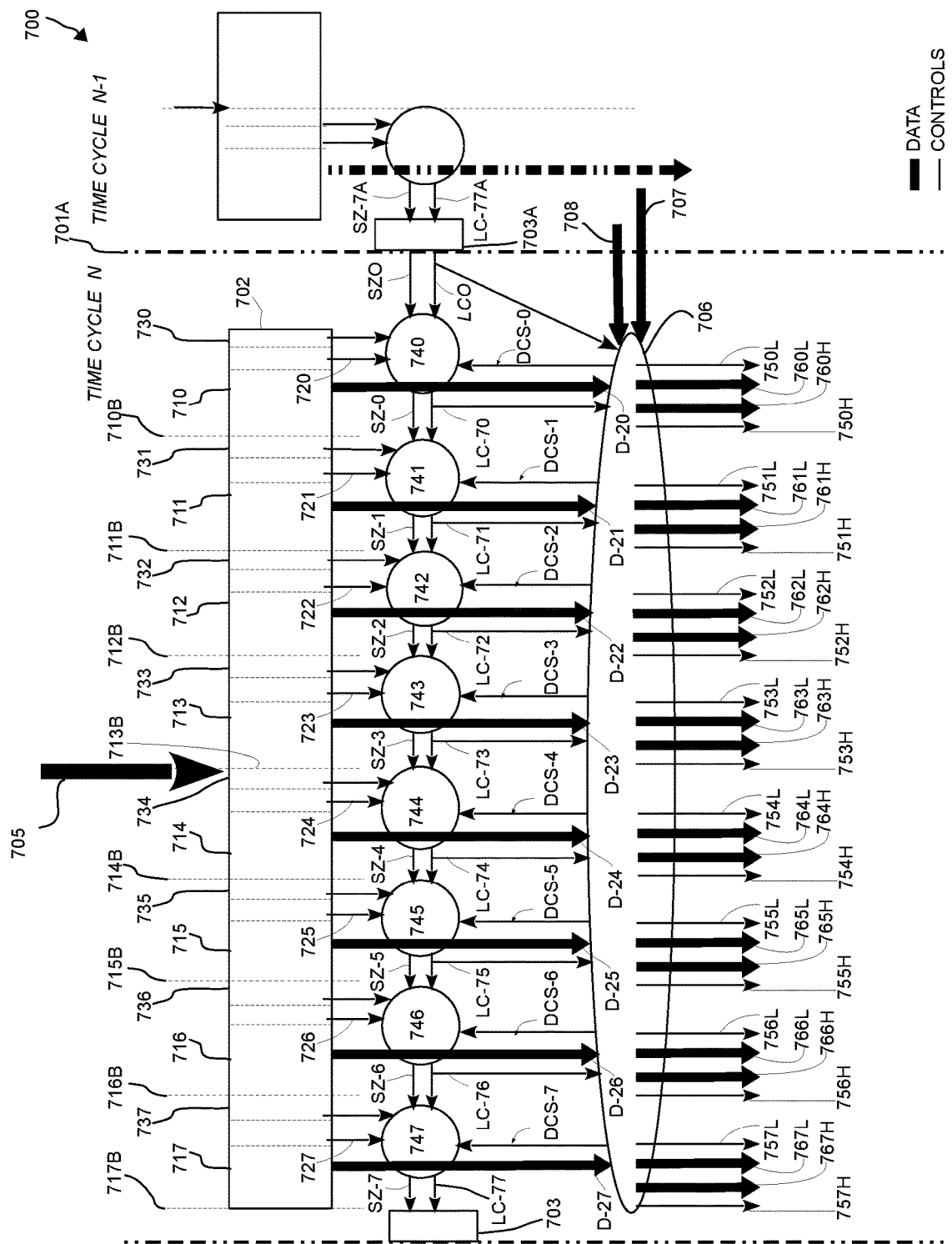
FIG. 7A illustrates an enhanced instruction demarcator using additional size signals, in accordance with one embodiment.

FIG. 7A illustrates an enhanced variation of an instruction demarcator 700 that uses a set of size indicator signals, in accordance with one embodiment. Optionally, this instruction demarcator 700 may be implemented in the context of any of the foregoing figures. The embodiment shown in FIG. 7A is an enhanced variation of the embodiment shown in Figure 5A and uses additional size indicator signals and logic to determine sizes of instructions for demarcation.

In some embodiments of FIG. 7A, an instruction sequence is received into instruction buffer 702, via an input 705. The instruction sequence in instruction buffer 702 comprises syllables 710, 711, 712, 713, 714, 715, 716 and 717 ending in boundaries at 710B, 711B, 712B, 713B, 714B, 715B, 716B and 717B, respectively, by virtue of the bit positions occupied by them in the instruction buffer 702. A sequence of size testing logic blocks (used for determining the end of an instruction) 740, 741, 742, 743, 744, 745, 746 and 747 arranged in stages each take as first inputs, corresponding LEN positioned bit(s) in the sequence 730, 731, 732, 733, 734, 735, 736 and 737 of the corresponding syllables 710 through 717 respectively. In some further embodiments, each of the size testing logic blocks 740 through 747 may also receive additional field positioned bit(s) of syllables on corresponding input signals comprising 720, 721, 722, 723, 724, 725, 726 and 727 as their first inputs. In some embodiments these additional field positioned bit(s) may be adjacent to the LEN positioned bit(s) in any syllable. In some other embodiments these additional field positioned bit(s) may NOT be adjacent to the LEN positioned bit(s) in any syllable. The LEN positioned bit(s) and field positioned bit(s) together will be referred to as 'field positioned bits' in this context.

The size testing logic blocks 740, 741, 742, 743, 744, 745, 746 and 747 generate corresponding first outputs LENCARRY LC-70, LC-71, LC-72, LC-73, LC-74, LC-75, LC-76 and LC-77 respectively, to indicate end of an instruction. The first output LENCARRY LC-77 of a last stage size testing logic block 747 may be used to drive the first input to a CARRYOVER storage entity 703 (referred to as 703A in a preceding time cycle/iteration) to store the LENCARRY (CARRYOVER storage entity 703 is an enhanced variation of LCOVR storage entity since it also stores size indicator information from a preceding time cycle or iteration). In some embodiments the CARRYOVER storage entity 703 has a first output LCO to transfer the stored LENCARRY from a preceding time cycle or iteration and drives the second input LENCARRY_IN of the size testing logic block 740. Each of the size testing logic blocks 741 through 747 receives a corresponding second input LENCARRY_IN from the sequence LC-70, LC-71, LC-72, LC-73, LC-74, LC-75 and LC-76, respectively (similar to the LEN test logic blocks 440 through 447 in FIG. 4A). Additionally, the size testing logic blocks 740, 741, 742, 743, 744, 745, 746 and 747 each take an additional corresponding third input decoupler control signal from the sequence comprising DCS-0, DCS-1, DCS-2, DCS-3, DCS-4, DCS-5, DCS-6 and DCS-7, respectively, in order to optionally decouple the corresponding enhanced logic block from its second input LENCARRY_IN, when the corresponding third input decoupler control signal is activated. The size testing logic blocks 740 through 747 also generate as their second outputs, the corresponding size indicator signals in the sequence SZ-0, SZ-1, SZ-2, SZ-3, SZ-4, SZ-5, SZ-6 and SZ-7, respectively, to provide a size indicator value at each stage that is used to compute the end of an instruction indicator. The size indicator signal SZ-7 from a final stage size testing logic block 747 may drive a second input to the CARRYOVER storage entity to store the corresponding stage size indicator value. The stored size indicator value is presented as a size carry over (SZO) value on the SZO second output signal of the CARRYOVER storage entity in a succeeding cycle to transfer the size information from a preceding time cycle or iteration. The value of size indicator at a stage is derived from value of the size indicator from a preceding stage size testing logic block and/or from one or more op fields. The SZO value is used to carry over the size information from the last processed syllable in a preceding time cycle using one or more storage elements in the CARRYOVER storage entity 703. Here the storage elements in CARRYOVER storage entity 703 are configured to hold the first output LENCARRY LC-77 and the size SZ-7 values across a time cycle (clock cycle) boundary such as 701A. Additionally, in some embodiments, each of the size testing logic blocks 741 through 747 also receives as its fourth input a corresponding size indicator signal from the sequence of size indicator signals SZ-0, SZ-1, SZ-2, SZ-3, SZ-4, SZ-5 and SZ-6, respectively. In some embodiments the size testing logic block 740 receives its fourth input from the SZO second output signal of the CARRYOVER storage entity 703. In some embodiments each size indicator signal may comprise one or more bits. In the context of this disclosure, a size indicator signal carries size related information associated with an instruction. In some embodiments a size indicator at a stage may give an indication of the number of the corresponding syllable in an instruction; or in some other embodiments size indicator at a stage may give the number of remaining syllables in an instruction. In some embodiments the size indicator may give a number related to the length of an instruction in number of bits or bytes or syllables in an instruction. In some embodiments the size indicator signals may also take up the functionality of the LENCARRY and LENCARRY_IN signals to indicate end of a preceding instruction and start of a new instruction, thereby eliminating the need to generate and consume these LENCARRY signals.

In some embodiments, the syllables of an instruction that is not completely demarcated in a preceding time cycle/iteration are also stored in a storage entity (not shown) similar to the CARRYOVER storage entity and transmitted in a following time cycle/iteration as input to the controlling logic block 706 using a carryover syllable bus 708.

In some embodiments the third input decoupler control signals DCS-0 through DCS-7 may also be used to optionally decouple the corresponding enhanced logic block from its fourth input size indicator signal when the corresponding third input decoupler control signal is activated. In some embodiments, the size indicator signals SZ-0 through SZ-6 may be routed and coupled to the size testing logic blocks 741 through 747 via controlling logic block 706 and may be combined with decoupler control signals DCS-0 through DCS-7. In such a configuration the decoupler control signals DCS-0 through DCS-7 may combine their previously described function related to decoupling a logic block as illustrated in the embodiment of FIG. 5A, with additional functionality associated with the size indicator signals and transmit the newly computed size indicator next values from the controlling logic block 706 to the size testing logic blocks 740 through 747 respectively; the newly computed size indicator next values are computed at every stage from one or more signals such as target address input 707 (used to provide a target address or a target equivalent address to compute the decoupler control signals), the SZO second output signal, and size indicator signals SZ-0, SZ-1, SZ-2, SZ-3, SZ-4, SZ-5 and SZ-6. These computations may be done at least in part in the controlling logic block 706 and/or the size testing logic blocks 740 through 747. Here, a target address (or target equivalent address) of the next instruction to be examined may be obtained and provided on target address input 707 to the controlling logic block 706 to compute, configure and control the decoupler control signals. Further, in some embodiments one or more of the size testing logic blocks comprising 740 through 747 and controlling logic block 706 may be combined. In some further embodiments, the address signal 707 may be processed at least in part by the size testing logic blocks 740 through 747.

In some embodiments, the value of the size indicator signals at a stage corresponding to the starting syllable of an instruction may be determined initially based on the field positioned bit(s) of the syllable at that stage. In various embodiments, in a subsequent stage/syllable of that instruction, the size indicator value may variously be incremented, decremented, and/or shifted, and/or modified/computed based on some logic using the value of the size signals from its preceding stage(s) and/or one or more field positioned bit(s) and/or the LEN positioned bit(s). The last syllable may be identified when the size indicator value reaches a final terminal value (corresponding to that of a single syllable instruction), such as a '0' value (but not limited to a '0' alone).

In one embodiment shown in FIG. 7A, the individual instructions are demarcated and the syllables are written out on data buses comprising 760H & 760L through 767H and 767L configured using control signals comprising 750H & 750L through 757H & 757L respectively. The instruction demarcator 700 in one embodiment may be further coupled to an instruction queue or to an instruction decoder.

Figure 7B:
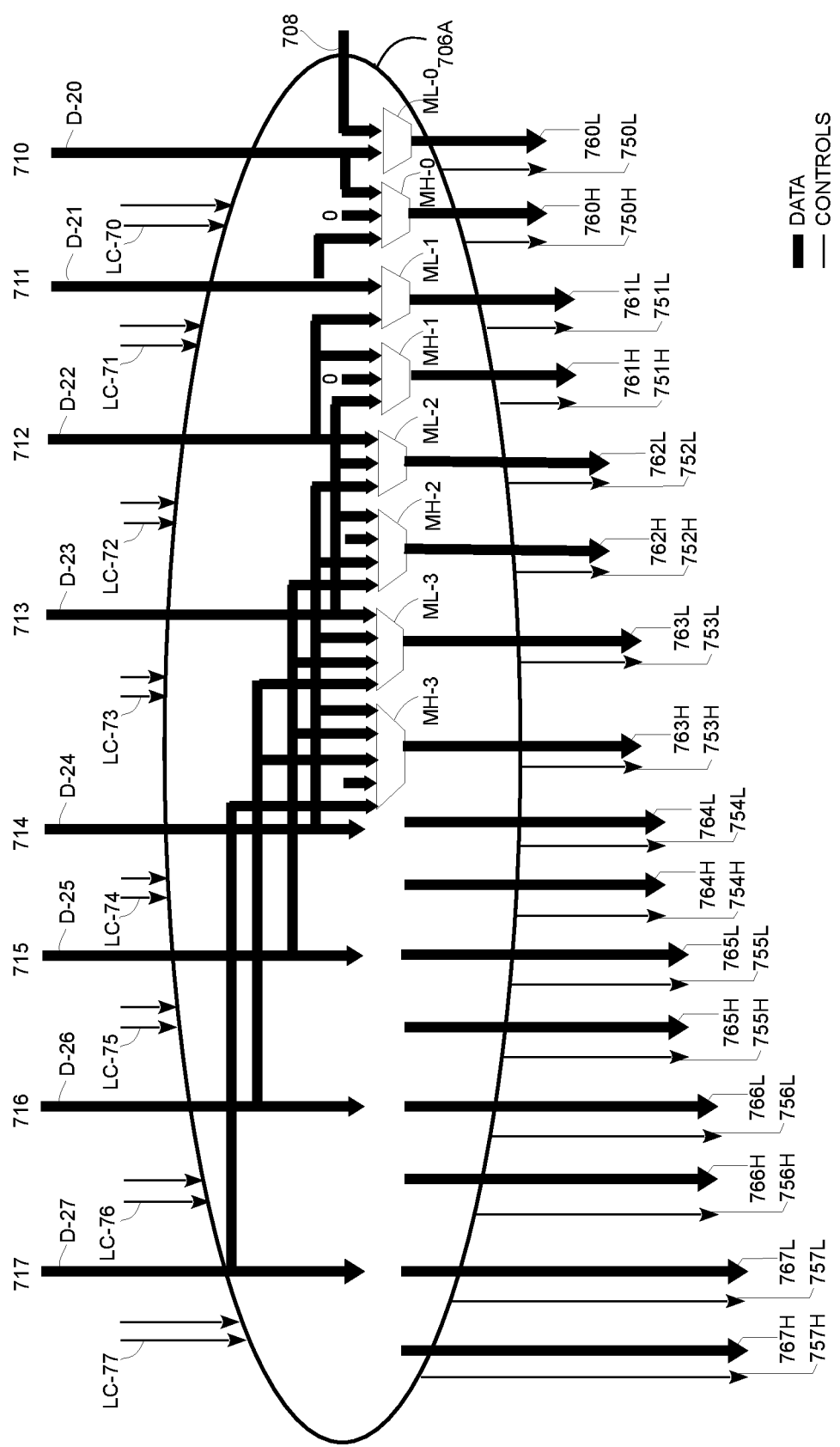
FIG. 7B illustrates a syllable data bus multiplexing configuration inside an instruction demarcator, in accordance with one embodiment.

FIG. 7B illustrates a syllable data bus multiplexer complex in accordance with one embodiment. Optionally, this syllable data bus multiplexing configuration may be implemented in the context of any of the foregoing figures in this description. In some embodiments the multiplexer complex resides in a controlling logic block 706A and comprises one or more multiplexers such as ML-0, MH-0, ML-1, MH-1, ML-2, MH-2, ML-3, MH-3 and so on, through ML-7, MH-7, and any other supporting logic blocks needed for functioning. The one or more multiplexers are configured and controlled by the supporting logic blocks in the controlling logic block 706A (which comprises all the functionality of the controlling logic block 706 of FIG. 7A). In some embodiments a multiplexer with two or more data inputs and one or more control inputs typically has one output; one of the two or more data inputs is selected using the one or more control inputs and coupled to the one output to allow the flow of data from the selected data input to the one output.

In some embodiments as in FIG. 7B, the instruction syllables comprising 710 through 717 are driven from the instruction buffer on the corresponding syllable data buses comprising D-20 through D-27 as inputs to the controlling logic block 706A as shown. In some embodiments the carryover syllable bus 708 coupled to the data input to the controlling logic block 706A is used to present a syllable from an incomplete instruction in a preceding time cycle/iteration. In some embodiments the syllable data buses comprising D-20, D-21, D-22, D-23, D-24, D-25, D-26 and D-27 are multiplexed using syllable multiplexers comprising ML-0, MH-0, ML-1, MH-1, ML-2, MH-2 and so on, through ML-7, MH-7; further, the carry over syllable bus 708 is provided as one of the inputs to the multiplexer ML-0. The multiplexers ML-0, MH-0 through ML-7, MH-7 are configured and controlled by the logic in the controlling logic block 706A such that the syllables comprising 710 through 717 may be routed to the appropriate data buses comprising 760L, 760H, 761L, 761H, 762L, 762H, 763L, 763H, 764L, 764H, 765L, 765H, 766L, 766H and 767L, 767H as demarcated instructions. The logic inside the controlling logic block may receive control inputs comprising LC-70 through LC-77 along with other inputs such as size indicator signals (related to size of instruction) and may be used to compute, configure and control the syllable multiplexer selection signals. The controlling logic block also generates the control signals comprising 750L, 750H, 751L, 751H, 752L, 752H, 753L, 753H, 754L, 754H, 755L, 755H, 756L, 756H and 757L, 757H which are used to configure and control the data buses 760L, 760H through 767L, 767H and validity of the transmitted data, the writing/storage of that data into instruction queue entries or instruction decoders, or the next stage of logic. In a preferred embodiment of FIG. 7B the maximum instruction lengths equals 4 syllables and the multiplexer complex is configured accordingly. In some embodiments, in order to simplify the implementation logic the multiplexer complex may use one or more multiplexer trees to couple the input data buses to the output data buses.

In some embodiments all syllables of one instruction may be placed in contiguous instruction queue entries. In some embodiments the control signals may transmit different tag values to identify different instructions wherein all syllables of an instruction receive the same tag. In this context a tag value is a number associated with a syllable that identifies it with an instruction; so, in some embodiment, all syllables of an instruction will have the same tag value. In some embodiments the syllables of adjacent instructions may receive tag values 0 and 1, alternately, to demarcate the adjacent instructions by their tag value. In yet other embodiments an end-of-instruction flag or a start-of-instruction flag may be transmitted with a syllable to demarcate instructions.

Figure 8:
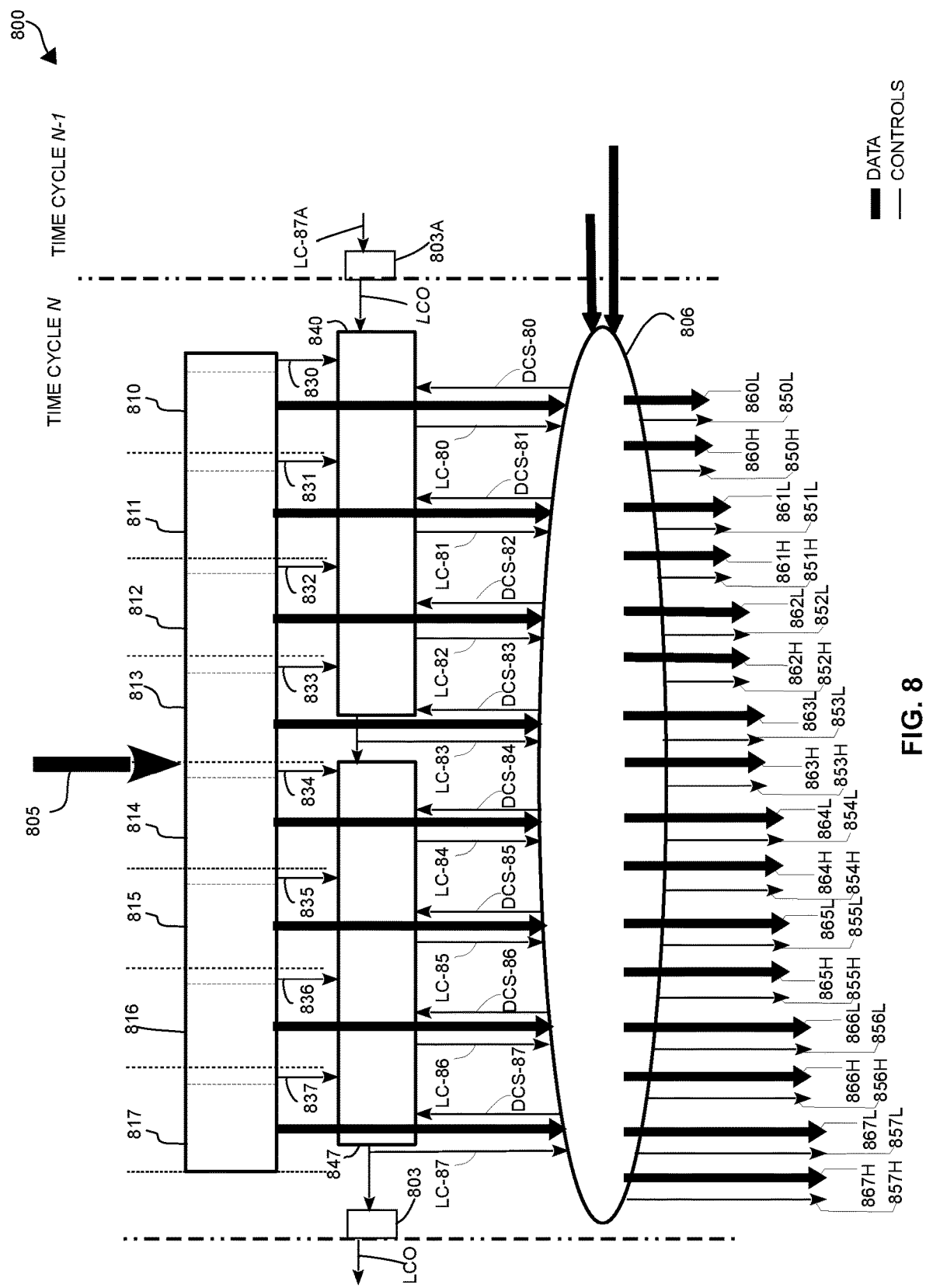
FIG. 8 illustrates a fast enhanced instruction demarcator in accordance with one preferred embodiment.

FIG. 8 illustrates a composite instruction demarcator in accordance with one embodiment. Optionally, this composite instruction demarcator 800 may be implemented in the context of any of the foregoing figures. It combines two or more logic blocks to replace a long LENCARRY chain of many stages with faster logic wherein all the LENCARRY outputs are computed simultaneously.

In some embodiments composite instruction demarcator 800 comprises one or more composite blocks such as 840 and 847. In some embodiments each composite block comprises two or more stages of logic blocks that take two or more syllables as their inputs. In some embodiments the composite block 840 receives first inputs comprising the field positioned bit(s) 830, 831, 832 and 833 of syllables 810, 811, 812 and 813, respectively. The composite block 847 receives first inputs comprising the field positioned bit(s) 834, 835, 836 and 837 of syllables 814, 815, 816 and 817, respectively. The LENCARRY signals comprising LC-80, LC-81, LC-82 and LC-83 are the first outputs of the composite block 840. The LENCARRY signals comprising LC-84, LC-85, LC-86 and LC-87 are first outputs of composite block 847. The composite block 840 receives a second input LENCARRY_IN signal coupled to the output LCO of a LCOVR storage entity 803A. Further, the composite block 847 receives a second input LENCARRY_IN coupled to the first output LENCARRY LC-83 of composite block 840. The first output LC-87 of the composite block 847 is used to drive the input to the LCOVR storage entity 803. The composite block 840 also receives third inputs comprising decoupler control signals DCS-80, DCS-81, DCS-82 and DCS-83. The composite block 847 also receives third inputs comprising decoupler control signals DCS-84, DCS-85, DCS-86 and DCS-87. The composite instruction demarcator 800 further comprises a controlling logic block 806 which receives the first output LENCARRY signals LC-80 through LC-87 as some of its inputs.

As mentioned earlier, a composite block combines one or more logic blocks to replace a long LENCARRY chain with many stages with faster logic wherein all the LENCARRY outputs are computed almost concurrently and fast by elimination of a rippling LENCARRY chain. In one possible logic implementation the logic at each stage in a composite block such as 840 receives the corresponding syllable and all its preceding syllables as inputs, as well as, the output LCO of the LCOVR storage entity; thereby, all the stages in the composite block 840 may compute and generate the first outputs LENCARRY LC-80, LC-81, LC-82 and LC-83 concurrently without using a rippling LENCARRY chain (where a 'rippling LENCARRY chain' means LENCARRY of each preceding stage feeds into the LENCARRY of a succeeding stage). In some embodiments the boolean logic may be further simplified if the signal widths are appropriately selected in an embodiment and a boolean simplification is exercised. The elimination of a rippling LENCARRY chain (as seen in the embodiments of FIGS. 4A and 5A) from inside the composite logic blocks speeds up the length decoding and instruction demarcation mechanisms making it a faster instruction demarcator.

In some further embodiments (not shown) the preceding first output LENCARRY signals LCO, LC-80, LC-81, LC-82, LC-83, LC-84, LC-85, LC-86 and LC-87 may each be used as control inputs to 2-input multiplexers that simply select one of two signal values computed using the rest of the signal variables. This mechanism may be combined with the earlier mechanism, along with the output LCO of the LCOVR storage entity 803A in order to select one of two intermediate LENCARRY outputs computed by the succeeding stages in a composite block.

Controlling logic block 806 comprises of one or more multiplexers and other logic (not shown) to select the syllables or constants to write to data buses such as 860L, 860H through 867L, 867H. Control signals 850L, 850H through 857L, 857H send various control commands indicating valid signals or tag values or other control values to instruction queues or instruction decoders or any following logic stages coupled to and driven by the data buses 860L, 860H through 867L, 867H. The instruction demarcator 800 in this embodiment may be further coupled to an instruction queue (FIG. 5B) or to an instruction decoder (FIG. 5C).

The description of the embodiment(s) heretofore is merely exemplary (illustrative) in nature and is in no way intended to limit the invention, its application, or uses. Additionally, the invention may be practiced according to the claims without some or all of the illustrative information.

FIG. 9 illustrates a network architecture 900, in accordance with one embodiment. As shown, a plurality of networks, Network 1 904, Network 2 906, and Network 3 902, are provided. In the context of the present network architecture, the networks, Network 1 904, Network 2 906, and Network 3 902 may each take any form including, but not limited to a local area network (LAN), a wireless network, a wide area network (WAN) such as the Internet, peer-to-peer network, etc. Additionally, such networks may include a RFID communication between Client 910 and another device (e.g. wearable, cloud, tag, etc.). Further, such networks may include any peer to peer (P2P) or device to device communication. In the context of the present description, a client may include an end user computer, a desktop computer, a laptop computer, a mobile device, a mobile phone, a tablet, a personal digital assistant (PDA), a television, a set-top box, a personal assistant with artificial intelligence, a robot with artificial intelligence, any internet-of-things cloud-connected device, etc.

Coupled to the Network 3 902 are one or more Servers 908 which are capable of communicating over the Network 3 902, as well as any other applicable networks (e.g. Network 1904, Network 2 906, etc.). Also coupled to Network 2 906 and Network 3 902 (or any other applicable network) and the Server 908 is a plurality of Clients 910. Such Server 908 and/or Client 910 may each include a desktop computer, lap-top computer, hand-held computer, mobile phone, portable device, personal digital assistant (PDA), peripheral (e.g. printer, etc.), a personal assistant with artificial intelligence, a robot with artificial intelligence, any internet-of-things cloud-connected device, any component of a computer, and/or any other type of logic. In order to facilitate communication among Network 1 904, Network 2 906, Network 3 902, and/or any other network, at least one Gateway 912 is optionally coupled there between. In the context of the present description, cloud refers to one or more servers, services, and/or resources which are located remotely.

FIG. 10 illustrates an exemplary system 1000 in which the various architecture and/or functionality of the previous embodiments and/or subsequent embodiments may be implemented. As shown, a system 1000 is provided including at least one host Central Processor 1010 which may be connected to a Communication Bus 1012. The system also includes a Main Memory 1008. Control logic (software) and data may be stored in the Main Memory 1008 which may take the form of random access memory (RAM).

The system may also include a Graphics Processor 1002 and a Display 1006, e.g. a computer monitor or an embedded display. In one embodiment, the Graphics Processor 1002 may include a plurality of shader modules, a rasterization module, etc. Each of the foregoing modules may even be situated on a single semiconductor platform to form a graphics processing unit (GPU).

The system may also include a Secondary Storage 1004. The Secondary Storage 1004 includes, for example, at least one of a non-volatile memory (e.g. flash memory, magneto-resistive memory, ferroelectric memory, etc.), a hard disk drive, a solid state drive, and a removable storage drive, representing a floppy disk drive, a magnetic tape drive, an optical drive such as a compact or digital versatile disk drive, a usb and/or jump drive, etc. The removable storage drive reads from and/or writes to a removable storage unit in a well known manner.

Computer programs, or computer control logic algorithms, may be stored in the Main Memory 1008 and/or the Secondary Storage 1004. Such computer programs, when executed, enable the system to perform various functions. The Main Memory 1008, the Secondary Storage 1004 and/or any other storage are possible examples of computer-readable media.

In one embodiment, the architecture and/or functionality of the various previous figures may be implemented in the context of the host Central Processor 1010, Graphics Processor 1002, an integrated circuit (not shown) that is capable of at least a portion of the capabilities of both the host Central Processor 1010 and the Graphics Processor 1002, a chipset (i.e. a group of integrated circuits designed to work and sold as a unit for performing related functions, etc.), and/or any other integrated circuit for that matter. In some embodiments a co-processor, or an accelerator 1016 may perform functions and/or implement various methods and implementations disclosed in any of the previous figures.

Additionally, the architecture and/or functionality of the various previous figures may be implemented in the context of a general computer system, a circuit board system, a game console system dedicated for entertainment purposes, an application-specific system, and/or any other desired system. For example, the system may take the form of a desktop computer, a laptop computer, a server computer, and/or any other type of logic. Still yet, the system may take the form of various other devices including, but not limited to, a personal digital assistant (PDA) device, a mobile device, a tablet device, a television, etc. In the context of the present description, a mobile device may include any portable computing device, including but not limited to, a laptop computer, a tablet computer, a desktop computer, a mobile phone, a media player, a camera, a television, a personal assistant with artificial intelligence, a robot with artificial intelligence, any internet-of-things cloud-connected device, and/or any other portable computing device.

Further, while not shown, the system may be coupled to a network (e.g. a telecommunications network, local area network (LAN), wireless network, wide area network (WAN) such as the Internet, peer-to-peer network, cable network, etc.) for communication purposes using a network interface 1014. As an example, any of the Network 1904, Network 2 906, and/or Network 3 902 may be used for such coupling.

Of course, the various embodiments set forth herein may be implemented utilizing hardware, software, or any desired combination thereof. For that matter, any type of logic may be utilized which is capable of implementing the various functionality set forth herein.

The description of the embodiment(s) heretofore is merely exemplary (illustrative) in nature and is in no way intended to limit the invention, its application, or uses. Additionally, the invention may be practiced according to the claims without some or all of the illustrative information.

While specific embodiments of the invention have been described, it is understood that the present invention is not intended to be limited only to such embodiments. Additionally, the scope of the preferred embodiment should be defined by the following claims and their equivalents. Moreover, any combination of the above-described elements in all possible variations thereof is encompassed unless otherwise indicated herein or otherwise clearly contradicted by context. Further, the use of the terms "a" and "an" and "the" and similar referents in the context of describing the subject matter (particularly in the context of the claims) are to be construed to cover both the singular and the plural, unless otherwise indicated herein or clearly contradicted by context. No language in the specification should be construed as indicating any non-claimed element as essential to the practice of the invention as claimed.

What is claimed is:

1. An instruction demarcator comprising:
   an instruction buffer to receive and store an instruction sequence comprising a plurality of instruction syllables;
   two or more logic blocks arranged in a sequence of a plurality of stages that individually receive respective sets of one or more field positioned bits of respective individual ones of the plurality of instruction syllables from the instruction buffer as respective first inputs, the two or more logic blocks generating respective LENCARRY signals,
   wherein individual ones of the two or more logic blocks receive respective second inputs coupled to the respective LENCARRY signals from respective preceding stages of the plurality of stages,
   wherein the two or more logic blocks are configured to determine a length of at least one instruction and at least one boundary, and wherein the respective LENCARRY signals are used to indicate a last syllable of the at least one instruction; and
   a controlling logic block to demarcate the instruction sequence into individual instructions at the at least one boundary based on the respective LENCARRY signals.

2. The instruction demarcator of claim 1, wherein the two or more logic blocks are configured to individually generate one or more control signals, and wherein the one or more control signals comprise one or more members selected from the group consisting of: a single syllable instruction signal, a multi-syllable instruction signal, an incomplete instruction carryover signal, and an end of instruction marker.

3. The instruction demarcator of claim 1, wherein the respective sets of one or more field positioned bits of respective individual instruction syllables are used to determine the length of the at least one instruction.

4. The instruction demarcator of claim 1, wherein an instruction syllable of the plurality of instruction syllables is a single syllable instruction.

5. The instruction demarcator of claim 1, wherein two or more instruction syllables of the plurality of instruction syllables are a multi-syllable instruction.

6. The instruction demarcator of claim 1, wherein the two or more logic blocks are configured such that respective last syllables are identified at ends of respective individual instructions.

7. The instruction demarcator of claim 1, wherein the controlling logic block generates output signals that are based on the respective LENCARRY signals generated by the two or more logic blocks, the output signals configured to control a data bus.

8. The instruction demarcator of claim 7, wherein the output signals transmit tag values.

9. The instruction demarcator of claim 7, wherein the output signals transmit a start-of-instruction flag with an instruction syllable.

10. The instruction demarcator of claim 1, wherein the instruction demarcator further comprises one or more instruction queues to receive and store at least one of a single syllable instruction of the plurality of instruction syllables or a multi-syllable instruction of the plurality of instruction syllables within the one or more instruction queues.

11. The instruction demarcator of claim 1, wherein the instruction demarcator further comprises one or more instruction decoders to decode the individual instructions after demarcation.

12. The instruction demarcator of claim 1, wherein the controlling logic block is configured such that a sequence of two or more decoupler control signals is generated, arranged in correspondence with the two or more logic blocks arranged in a sequence of a plurality of stages.

13. The instruction demarcator of claim 12, wherein respective individual ones of the two or more decoupler control signals are input to respective individual ones of the two or more logic blocks arranged in a sequence.

14. The instruction demarcator of claim 13, wherein at least one of the two or more logic blocks is configured to be decoupled from one of the respective second inputs based on the respective individual ones of the two or more decoupler control signals.

15. The instruction demarcator of claim 12, wherein the controlling logic block is configured such that a target address is received as input by the controlling logic block to configure the two or more decoupler control signals, and wherein the target address includes a target equivalent address which identifies a target instruction syllable of the plurality of instruction syllables corresponding with a next starting point.

16. The instruction demarcator of claim 15, wherein the target address is generated in response to redirection of an execution thread.

17. The instruction demarcator of claim 1, wherein the controlling logic block comprises at least two multiplexers to demarcate and output individual instructions.

18. The instruction demarcator of claim 1, wherein the two or more logic blocks are configured to individually generate a size indicator signal.

19. A method to demarcate instructions comprising:
receiving and storing an instruction sequence comprising a plurality of instruction syllables in an instruction buffer;
configuring two or more logic blocks arranged in a sequence of a plurality of stages to individually receive respective sets of one or more field positioned bits of respective individual ones of the plurality of instruction syllables from the instruction buffer as respective first inputs, wherein the two or more logic blocks generate respective LENCARRY signals,
wherein individual ones of the two or more logic blocks receive respective second inputs coupled to the respective LENCARRY signals from respective preceding stages of the plurality of stages, wherein the two or more logic blocks determine a length of at least one instruction and at least one boundary, and wherein the respective LENCARRY signals are used to indicate a last syllable of the at least one instruction; and
configuring a controlling logic block to demarcate the instruction sequence into individual instructions at the at least one boundary based on the respective LENCARRY signals.

\* \* \* \* \*